(12) United States Patent
Slawinski et al.

(10) Patent No.: US 9,283,681 B2
(45) Date of Patent: Mar. 15, 2016

(54) ROBOTIC VEHICLE SYSTEMS FOR INSPECTING REMOTE LOCATIONS

(71) Applicants: Michael D. Slawinski, Buford, GA (US); Dennis L. Guthrie, Suwanee, GA (US)

(72) Inventors: Michael D. Slawinski, Buford, GA (US); Dennis L. Guthrie, Suwanee, GA (US)

(73) Assignee: Tobor Technology, LLC, Buford, GA (US)

(*) Notice: Subject to any disclaimer, the term of this patent is extended or adjusted under 35 U.S.C. 154(b) by 0 days.

(21) Appl. No.: 14/690,908

(22) Filed: Apr. 20, 2015

(65) Prior Publication Data

US 2015/0343644 A1    Dec. 3, 2015

Related U.S. Application Data

(63) Continuation-in-part of application No. 14/304,696, filed on Jun. 13, 2014, now Pat. No. 9,010,465, which is a continuation of application No. 14/143,227, filed on Dec. 30, 2013, now Pat. No. 8,789,631, which is a continuation of application No. 13/436,904, filed on Mar. 31, 2012, now Pat. No. 8,651,206.

(60) Provisional application No. 61/516,219, filed on Mar. 31, 2011.

(51) Int. Cl.
| | |
|---|---|
| *B62D 55/065* | (2006.01) |
| *B25J 11/00* | (2006.01) |
| *E04D 15/02* | (2006.01) |
| *B62D 55/075* | (2006.01) |
| *B25J 5/00* | (2006.01) |

(52) U.S. Cl.
CPC ............. *B25J 11/008* (2013.01); *B25J 5/005* (2013.01); *B62D 55/075* (2013.01); *E04D 15/02* (2013.01); *Y10S 901/01* (2013.01)

(58) Field of Classification Search
CPC ...... B62D 55/065; B62D 57/00; B62K 3/007; B60B 2310/305
See application file for complete search history.

(56) References Cited

U.S. PATENT DOCUMENTS

| | | | |
|---|---|---|---|
| 4,932,831 A | 6/1990 | White et al. | |
| 4,977,971 A * | 12/1990 | Crane, III | B62D 55/075 180/8.3 |

(Continued)

OTHER PUBLICATIONS

Geer, D.; Robot Roof Inspector Holds Its Footing, SERVO, Oct. 2007, pp. 10-12.

(Continued)

*Primary Examiner* — John Walters
*Assistant Examiner* — James Triggs
(74) *Attorney, Agent, or Firm* — Culhane Meadows PLLC; J. Scott Anderson

(57) ABSTRACT

Vehicles, systems, and methods for inspecting and analyzing the condition of a remote location such as a roof are presented. A vehicle adapted for traversing an irregular terrain may be supported by wheels, or tracks, having partially collapsible treads to help the vehicle maintain a lower center of mass. The bottom surface of the chassis may have a higher ground clearance at an intermediate location, relative to the front and rear ends, to help the vehicle maintain a lower center of mass when crossing ridges such as roof peaks. A vehicle for roof inspections may include a shingle lifter. A system for collecting and storing inspection data may include an onboard imaging system with multiple cameras and a control system with a wireless router, together with a remote tablet computer having a wireless transceiver, a user interface, and a display. Vehicles and systems may gather and analyze data, and generate revenue by providing data, analysis, and reports for a fee to interested parties.

22 Claims, 30 Drawing Sheets

(56) References Cited

U.S. PATENT DOCUMENTS

| | | | |
|---|---|---|---|
| 5,297,644 A | | 3/1994 | Clar et al. |
| RE38,479 E | | 3/2004 | Henkin et al. |
| 6,802,237 B1 | * | 10/2004 | Jones ............... B63G 7/02 102/402 |
| 6,860,571 B2 | * | 3/2005 | Scheetz ............ B62D 55/112 180/9.5 |
| 7,641,006 B2 | * | 1/2010 | Scheetz ............ B62G 5/02 180/9.5 |
| 8,316,971 B2 | | 11/2012 | Couture et al. |
| 8,326,469 B2 | * | 12/2012 | Phillips ............. G05D 1/0088 701/2 |
| 2004/0187249 A1 | | 9/2004 | Jones et al. |
| 2008/0183332 A1 | | 7/2008 | Ohm et al. |
| 2009/0265193 A1 | | 10/2009 | Collins et al. |

OTHER PUBLICATIONS

USPTO; Notice of Allowance; issued for U.S. Appl. No. 13/436,904, filed by Slawinski; submitting Notice of Allowance and Fee(s) Due, Notice of Allowability, and Notice of References Cited; total of 11 pages; relevant passages include those in the Notice of Allowability on pp. 2-4; dated Sep. 30, 2013 (USPTO Alexandria, Virginia).

Attorney for Slawinsky; Rule 312 Amendment After Notice of Allowance; U.S. Appl. No. 13/436,904, filed by Slawinski; total of 6 pages; relevant passages include those on pp. 2-6; submitted Dec. 29, 2013 (USPTO Alexandra, Virginia).

Attorney for Slawinski; Comments on Statement of Reasons for Allowance; U.S. Appl. No. 13/436,904, filed by Slawinski; total of 2 pages; submitted Dec. 29, 2013 (USPTO Alexandria, Virginia).

USPTO; Response to Rule 312 Communication; issued for U.S. Appl. No. 13/436,904, filed by Slawinski; total of 2 pages; dated Jan. 15, 2014 (USPTO Alexandria, Virginia).

USPTO; Notice of Allowance; issued for U.S. Appl. No. 14/143,227, filed by Slawinski; submitting Notice of Allowance and Fee(s) Due, Notice Requiring Inventor's Oath or Declaration; Notice of Allowability, and Notice of References Cited; total of 11 pages; relevant passages include those in the Notice of Allowability on pp. 2-4; dated Jun. 13, 2014 (USPTO Alexandria, Virginia).

Attorney for Slawinski; Comments on Statement of Reasons for Allowance; U.S. Appl. No. 14/143,227, filed by Slawinski; total of 2 pages; submitted (Jun. 13, 2014) (USPTO Alexandria, Virginia).

USPTO; Notice of Allowance; issued for U.S. Appl. No. 14/304,696, filed by Slawinski; submitting Notice of Allowance and Fee(s) Due, Notice Requiring Inventor's Oath or Declaration; Notice of Allowability, and Notice of References Cited; total of 11 pages; relevant passages include those in the Notice of Allowability on pp. 2-4; dated Aug. 20, 2014 (USPTO Alexandria, Virginia).

Attorney for Slawinski; Request for Continued Examination (RCE) and Amendment; U.S. Appl. No. 14/304,696, filed by Slawinski; total of 11 pages; relevant passage includes those in the Amendment on pp. 2-7; submitted Nov. 20, 2015 (USPTO Alexandria, Virginia).

USPTO; (Second) Notice of Allowance; issued for U.S. Appl. No. 14/304,696, filed by Slawinski; submitting Notice of Allowance and Fee(s) Due, Notice of Allowability, and Notice of References Cited; total of 10 pages; relevant passages include those in the Notice of Allowability on pp. 2-4; dated Dec. 22, 2014 (USPTO Alexandria, Virginia).

Attorney for Slawinski; Comments on Statement of Reasons for Allowance; U.S. Appl. No. 14/304,696, filed by Slawinski; total of 2 pages; submitted Mar. 20, 2015 (USPTO Alexandria, Virginia).

* cited by examiner

ROBOTIC VEHICLE SYSTEMS FOR INSPECTING REMOTE LOCATIONS

CROSS-REFERENCE TO RELATED APPLICATIONS

This application is a continuation-in-part of application Ser. No. 14/304,696, entitled "Robotic Vehicle Systems for Inspecting Remote Locations," filed Jun. 13, 2014, and expected to issue on Apr. 21, 2015, as U.S. Pat. No. 9,010,465; which is a continuation of application Ser. No. 14/143,227, entitled "Roof Inspection Systems With Autonomous Guidance," filed Dec. 30, 2013, which issued on Jul. 29, 2014, as U.S. Pat. No. 8,789,631 B2; which is a continuation of application Ser. No. 13/436,904, entitled "Roof Inspection Systems and Methods of Use," filed Mar. 31, 2012, which issued on Feb. 18, 2014, as U.S. Pat. No. 8,651,206 B2; which claims the benefit of U.S. Provisional Application No. 61/516,219, entitled "Remote Roof Inspection Apparatus and Method of Use," filed Mar. 31, 2011. Each application identified above is incorporated herein by reference in its entirety in order to provide continuity of disclosure.

BACKGROUND

The following disclosure relates generally to roof inspection systems and methods of using roof inspection systems.

The tasks of climbing a ladder and inspecting a roof, on foot, are inherently dangerous. Every year, thousands of people are injured or killed in falls from a ladder or off a roof.

Roofs often include a variety of shapes, features and obstacles. For example, a roof may have multiple peaks and valleys, a high slope or pitch, and may include numerous obstacles such as chimneys, vents, skylights, rain gutters, power lines, roof-mounted equipment, natural debris, and other objects. In addition to the danger presented by these features, a roof inspector might not inspect areas of the roof that are difficult or dangerous. Weather conditions can make the task more dangerous and/or delay the inspection. Walking on a roof can damage the surface.

From roofing contractors to insurance company personnel, workers in a variety of endeavors must inspect a roof as part of their job duties and responsibilities. Proper roof inspection techniques—especially safety precautions—require extensive training, physical endurance, and years of practice developing the necessary skills. Climbing and working safely on a roof requires large ladders, ropes, safety harnesses, and often a large truck to haul the equipment to the site. Providing a second person on site for assistance and safety adds cost to the process, without adding to the reliability of the final report.

The reliability of a roof inspection and analysis is limited by the subjective experience and motives of the roof inspector, who is often called upon to evaluate whether a roof should be repaired or replaced by an insurance provider. For example, a good roof inspector should be able to recognize and distinguish hail damage (often covered by insurance) and minor heat blistering (not covered). Roof inspectors rely on their experience and knowledge of the causes of various kinds of roof damage, using subjective methods to make a damage assessment and a recommendation to the insurer. The reliability of the roof assessment depends on the education, training, and field experience of the particular roof inspector who performed the work.

Subjective assessments are also of limited value because of the risk of bias in the judgment of the roof inspector. Bias against the roof owner can be present when the inspector works for an insurance company that has a financial interest in denying a damage claim. Bias in favor of the roof owner can be present when the inspector works for a roofing company or other interest that may profit from reporting that the roof should be repaired or replaced by the insurance company. The financial incentives, together with the inherently subjective nature of roof inspectors' opinions, have produced a climate of mistrust and suspicion.

Personal roof inspection is dangerous and unsatisfactory for at least the reasons described above. Aerial or satellite imaging of roof structures often produces low quality images, the equipment is subject to interference from cloud cover and trees, the cost is high, and it could take days or weeks to receive a report. Aerial imaging of roof structures using drones or unmanned aerial vehicles (UAVs) requires piloting skills and a lengthy period of training and, currently, the use of drones is limited or prohibited by federal and/or local regulations. Moreover, drones are unstable in windy environments and, without stability, cannot capture the images or video of sufficient quality to be useful. Efforts at developing a remote roof inspection device have been unsuccessful because the problems of poor traction, poor durability, and inherent instability on steep surfaces and when crossing roof peaks have not been solved.

SUMMARY

A vehicle, according to various embodiments, comprises (1) a chassis supported above a terrain and having an upper deck and a generally opposing bottom surface; (2) a motive system supported by the chassis and comprising at least one motor operative to propel the vehicle and one or more partially collapsible treads for frictionally engaging the terrain; (3) a power system supported by the chassis and providing energy to power the vehicle; (4) an imaging system supported by the chassis and comprising a driving camera having a lens assembly spaced apart from and above the chassis, an inspection camera mounted near a front end of the chassis; (5) a sensor system supported by the chassis and comprising one or more positional sensors and a plurality of range sensors; (6) a shingle lifter that is selectively attachable to the chassis, selectively connectable to the power system, and selectively in communication with the control system, the shingle lifter comprising (a) one or more elongated blades, each comprising a main body section having a first thickness and extending lengthwise to a tapered section, the tapered section having a gradually decreasing thickness from its juncture with the main body section to define a distal edge, and (b) a motor supported by a housing and operative to selectively rotate the one or more elongated blades between a lowermost position and an uppermost position; and (7) a control system supported by the chassis and electrically connected to the motive system, the power system, the imaging system, the sensor system, and the shingle lifter system, wherein the control system comprises a wireless router and one or more microcontrollers dedicated to monitoring the sensor system, processing the camera images, activating the motive system, operating the shingle lifter system, and receiving signals from the remote console, wherein the remote console comprises a tablet computer having user interface controls, a memory, and a wireless transceiver.

The motive system, according to various embodiments, may comprise one or more wheels for supporting the one or more partially collapsible treads. The motive system may also comprise a pair of substantially continuous tracks engaged with at least one driven sprocket engaged with the motor, and supported by at least one free sprocket, wherein each of the pair of tracks supports the one or more partially collapsible treads.

The chassis may be described as having a front end and a rear end with a longitudinal axis extending therebetween. The bottom surface of the chassis may define a first clearance near the ends and a second clearance along a substantially transverse axis extending between the sides and located intermediate the ends.

According to various embodiments, the second clearance is substantially greater than the first clearance when the chassis is positioned on a substantially planar surface, and wherein the one or more partially collapsible treads and the second clearance cooperate to substantially prevent overturning of the vehicle.

The tablet computer, according to various embodiments, further comprises a display and a cache of imaging data, the cache configured to store a subset of imaging data received via the wireless transceiver, and wherein the imaging system comprises a cache clearing routine for periodically clearing the imaging data from the cache. The remote console may further comprise a joystick configured to generate a signal responsive to one or more mechanical adjustments, wherein the signal directs the motion of the vehicle.

The user interface controls, according to various embodiments, may comprise a camera selector for displaying one or more images from the driving camera or the inspection camera, or both simultaneously.

The plurality of range sensors, according to various embodiments, comprises a front left range sensor, a front right range sensor, and a rear range sensor. The sensor system further comprises a selectively rotatable left boom assembly mounted to the chassis and supporting the front left range sensor above and beyond a left side of the chassis, and a selectively rotatable right boom assembly mounted to the chassis and supporting the front right range sensor above and beyond a right side of the chassis.

The shingle lifter, according to various embodiments, may further comprise a position sensor in communication with the motor and with the blades, and configured to sense a position of the one or more elongated blades; and a force sensor in communication with the motor and with the blades, configured to measure a force exerted against the one or more elongated blades.

The shingle lifter, according to various embodiments, may further comprise a lifter camera supported by the housing and electrically connected to the imaging system; and one or more lifter lamps supported by the housing, electrically connected to the control system, and positioned to illuminate at least a portion of the lifter camera's field of view. The user interface controls may comprise a camera selector for displaying one or more images from the driving camera, the inspection camera, or the lifter camera. The main body section of the elongate blades may comprise a proximal portion near the motor and a distal portion bent upwardly and at an obtuse angle relative to the proximal portion.

A vehicle, according to various embodiments, comprises (1) a chassis supported above a terrain and having an upper deck and a generally opposing bottom surface; (2) a motive system supported by the chassis and comprising at least one motor operative to propel the vehicle and one or more partially collapsible treads for frictionally engaging the terrain; (3) a power system supported by the chassis and providing energy to power the vehicle; (4) an imaging system supported by the chassis and comprising a driving camera having a lens assembly spaced apart from and above the chassis, an inspection camera mounted near a front end of the chassis, and a wireless router for transmitting camera images to a remote console; (5) a sensor system supported by the chassis and comprising one or more positional sensors and a plurality of range sensors, the range sensors comprising one or more leading-end range sensors and one or more trailing-end range sensors; and (6) a control system supported by the chassis and electrically connected to the motive system, the power system, the imaging system, and the sensor system, wherein the control system comprises a wireless router and one or more microcontrollers dedicated to monitoring the sensor system, processing the camera images, activating the motive system, and receiving signals from the remote console, wherein the remote console comprises user interface controls and a wireless transmitter, and wherein the control system comprises a ridge traversal routine that, in cooperation with the sensor system and the motive system, directs the motion of the vehicle in a semi-autonomous mode across a ridge at a velocity that is less than or equal to a velocity limit.

The ridge traversal routine, according to various embodiments, comprises instructions directing the vehicle: (a) to stop when the sensor system signals that one or more of the leading-end range sensors senses the presence of a ridge; (b) to remain stopped until a user places the vehicle in a ridge traversal mode, the mode characterized by a first velocity limit, a second velocity limit, and a resolution velocity limit; (c) to move toward the ridge at a first velocity that is less than or equal to the first velocity limit; (d) to stop when the sensor system signals that either one or more of the trailing-end range sensors senses the absence of a surface or one or more of the leading-end range sensors senses the presence of a surface; (e) to move at a second velocity that is less than or equal to the second velocity limit; (f) when the sensor system signals that one or more of the trailing-end range sensors senses the presence of a surface, to move at a resolution velocity that is less than or equal to the resolution velocity limit; and (g) to move at the resolution velocity until the vehicle stops at least once.

The motive system, according to various embodiments, may comprise one or more wheels for supporting the one or more partially collapsible treads. The motive system may also comprise a pair of substantially continuous tracks engaged with at least one driven sprocket engaged with the motor, and supported by at least one free sprocket, wherein each of the pair of tracks supports the one or more partially collapsible treads.

The chassis may be described as having a front end and a rear end with a longitudinal axis extending therebetween. The bottom surface of the chassis may define a first clearance near the ends and a second clearance along a substantially transverse axis extending between the sides and located intermediate the ends.

According to various embodiments, the second clearance is substantially greater than the first clearance when the chassis is positioned on a substantially planar surface, and wherein the one or more partially collapsible treads and the second clearance cooperate to substantially prevent overturning of the vehicle.

The user interface controls, according to various embodiments, may comprise a camera selector for displaying one or more images from the driving camera or the inspection camera, or both simultaneously.

The plurality of range sensors, according to various embodiments, comprises a front left range sensor, a front right range sensor, and a rear range sensor. The sensor system further comprises a selectively rotatable left boom assembly mounted to the chassis and supporting the front left range sensor above and beyond a left side of the chassis, and a selectively rotatable right boom assembly mounted to the chassis and supporting the front right range sensor above and beyond a right side of the chassis.

BRIEF DESCRIPTION OF THE DRAWING

Figure 1:
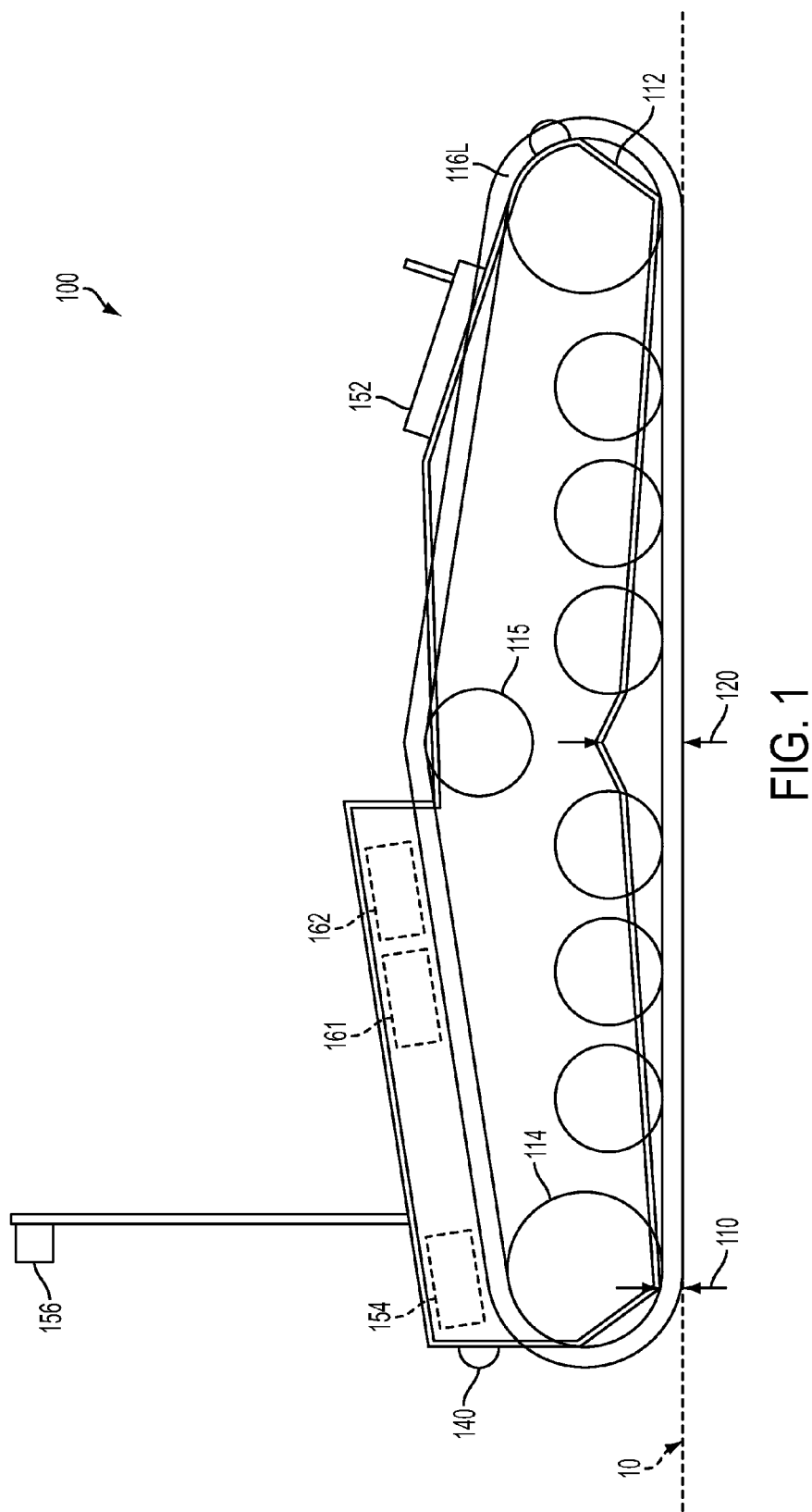

Having thus described various embodiments in general terms, reference will now be made to the accompanying drawings, which are not necessarily drawn to scale, and wherein:

FIG. 1 is an illustration of a side view of a vehicle supported by tracks, according to particular embodiments.

Figure 2:
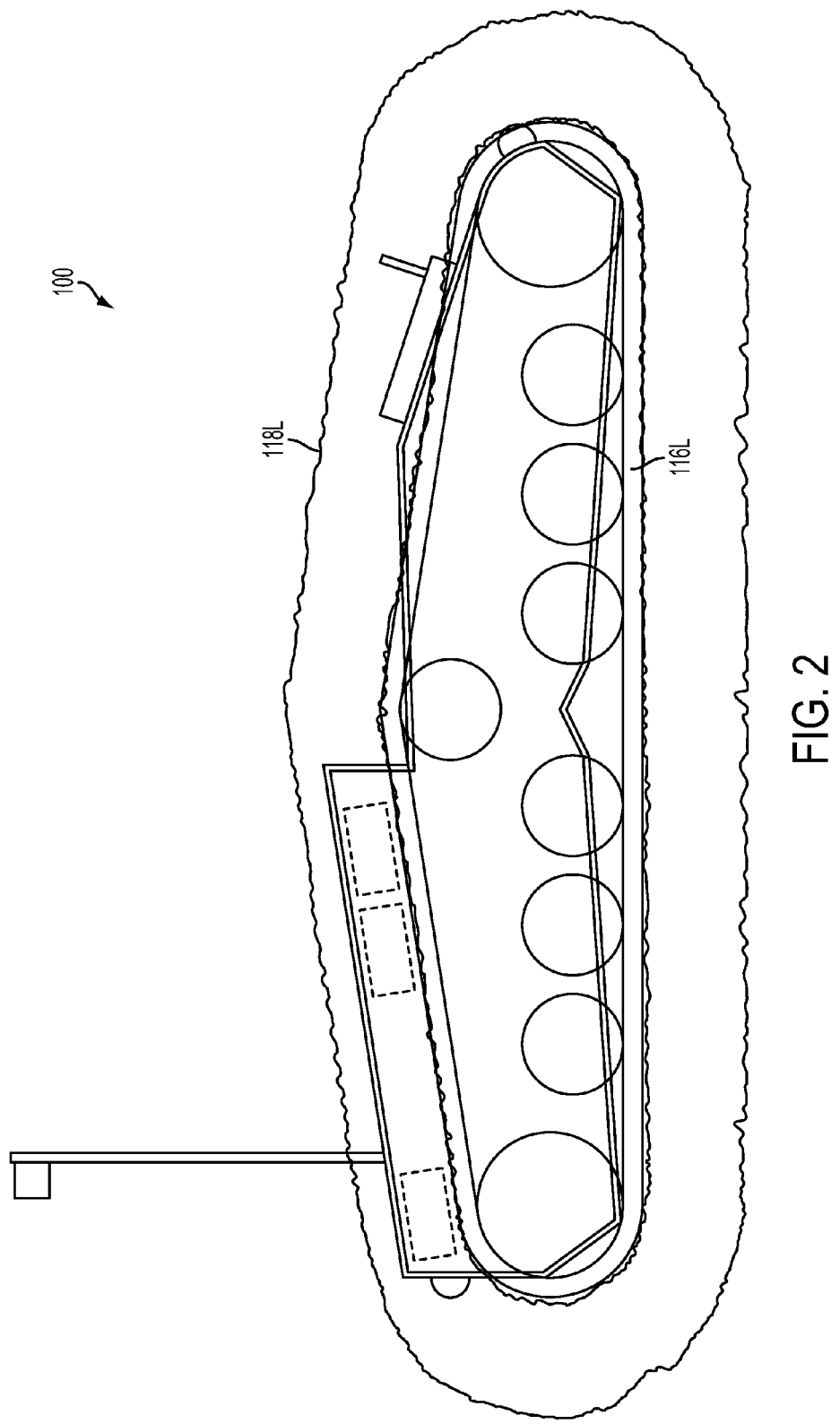

FIG. 2 is an illustration of a side view of a vehicle supported by tracks, as shown in FIG. 1, with partially collapsible treads attached to the tracks, according to particular embodiments.

Figure 3:
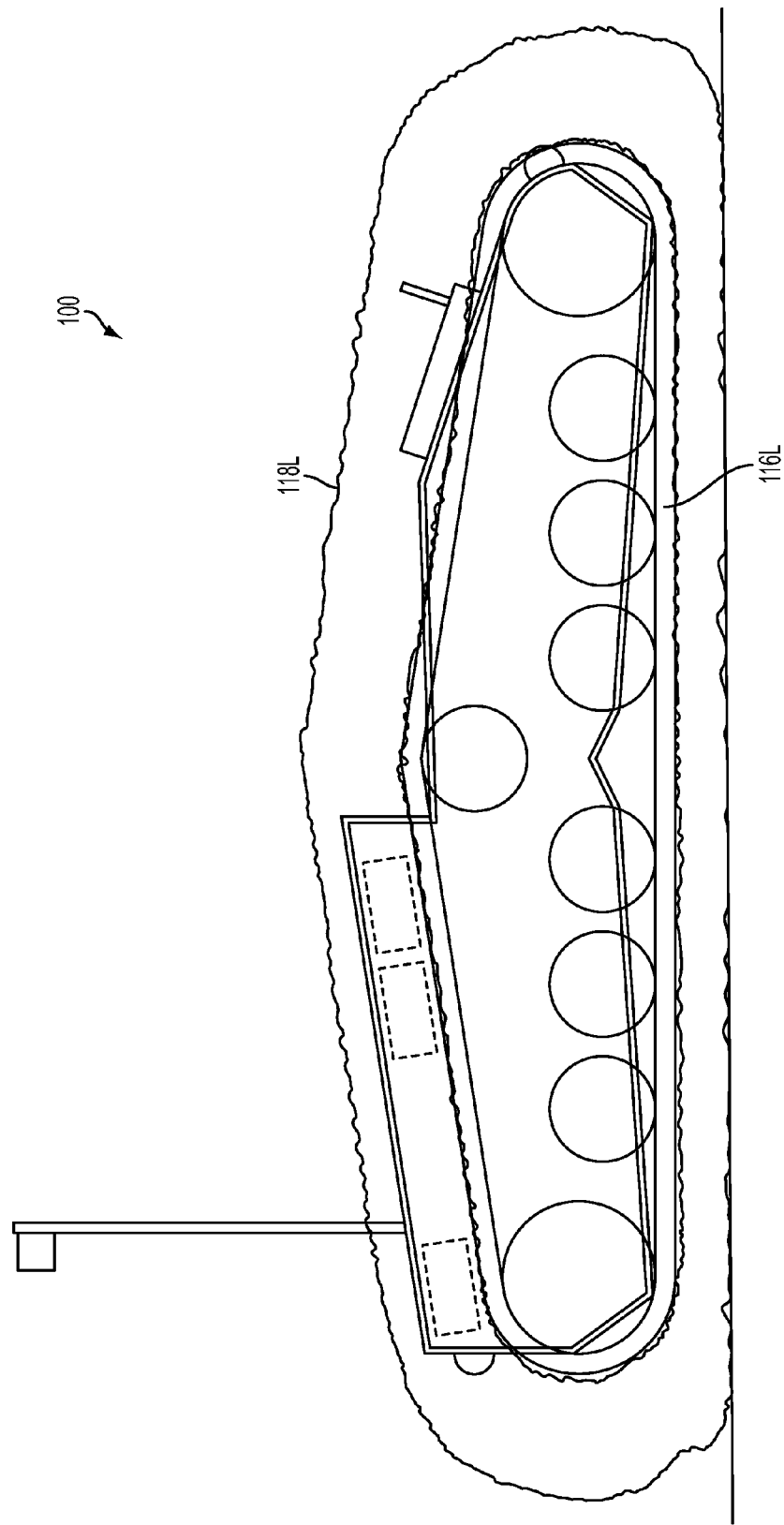

FIG. 3 is an illustration of a side view of a vehicle supported by tracks and partially collapsible treads, as shown in FIG. 2, positioned on a flat surface.

Figure 4:
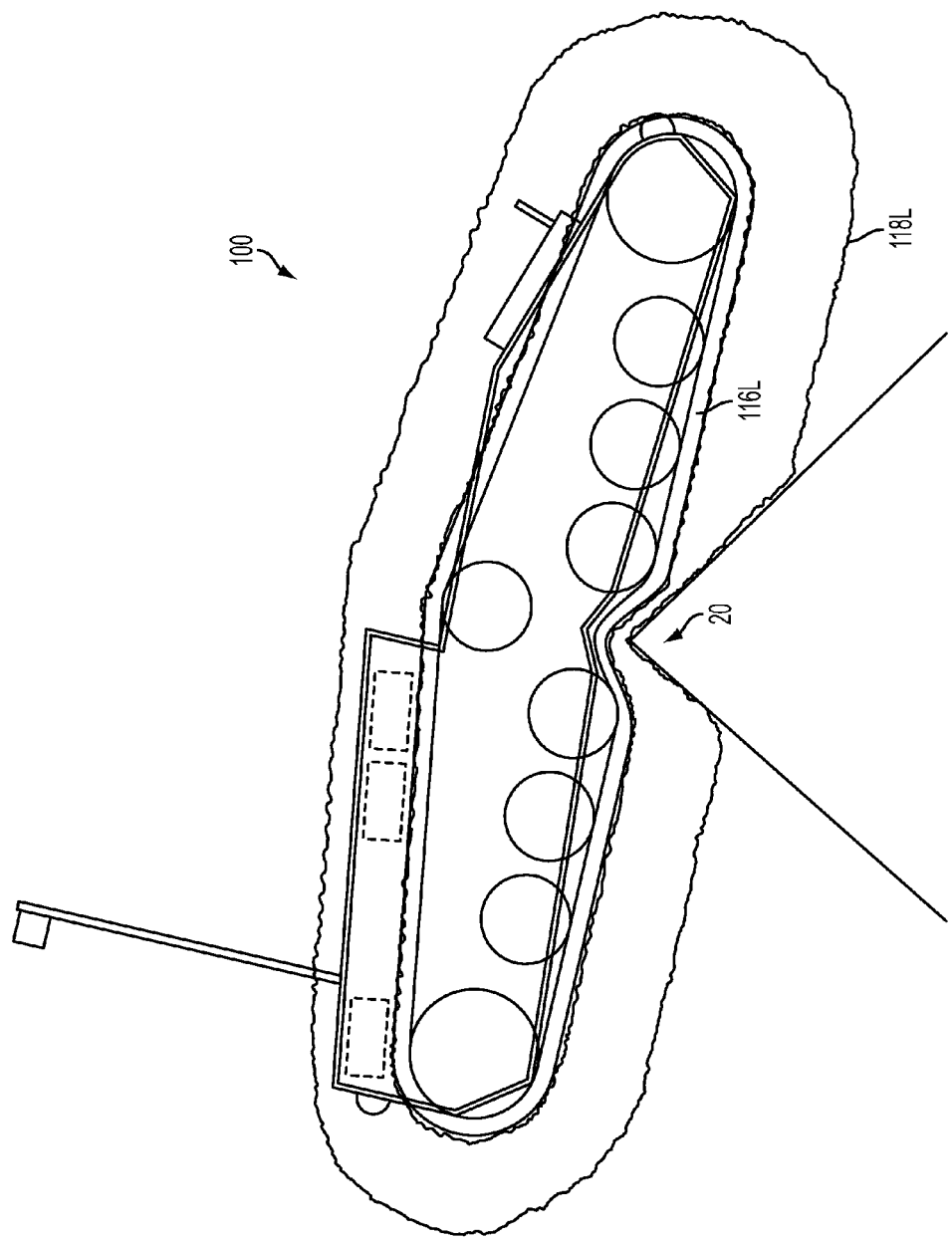

FIG. 4 is an illustration of a side view of a vehicle supported by tracks and partially collapsible treads, as shown in FIG. 2, positioned on the peak of a roof.

Figure 5:
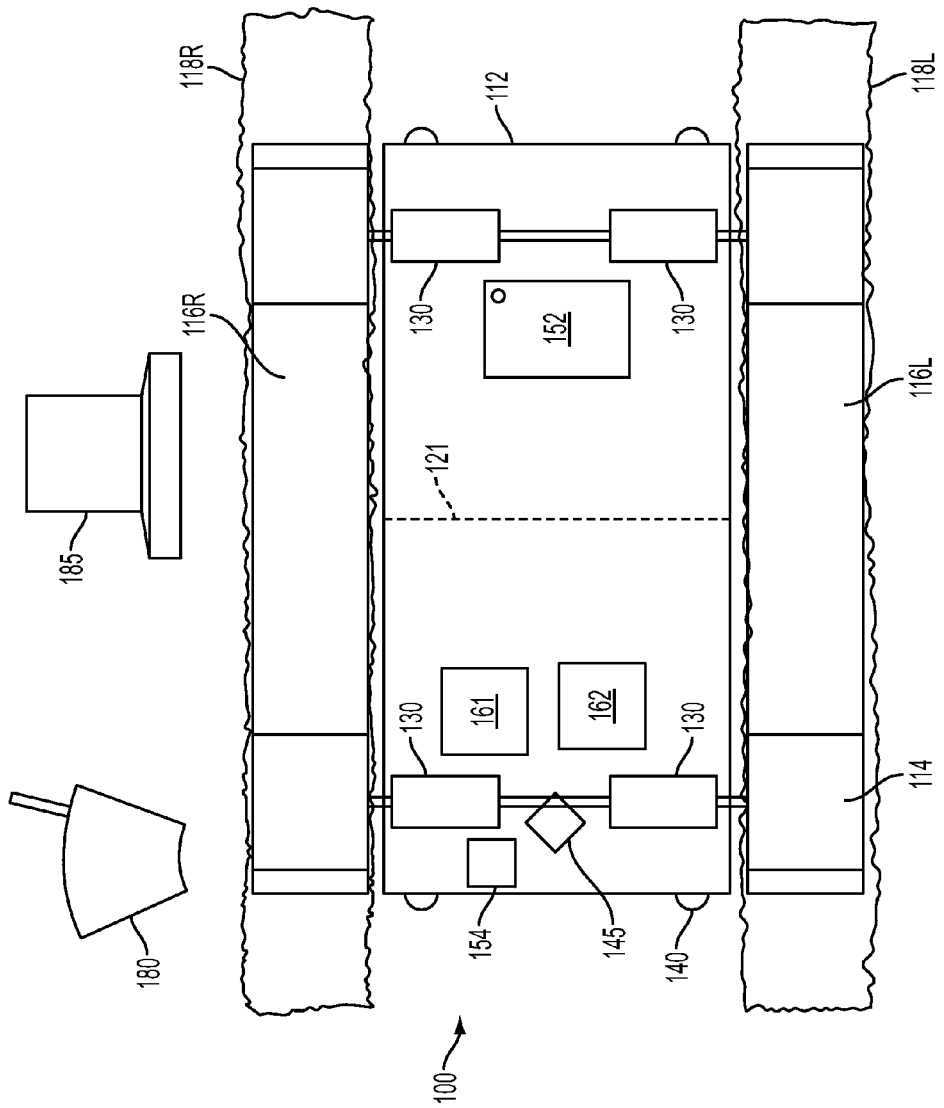

FIG. 5 is an illustration of a plan view of a vehicle supported by tracks and partially collapsible treads, along with a remote console and a remote computer, according to particular embodiments.

Figure 6:
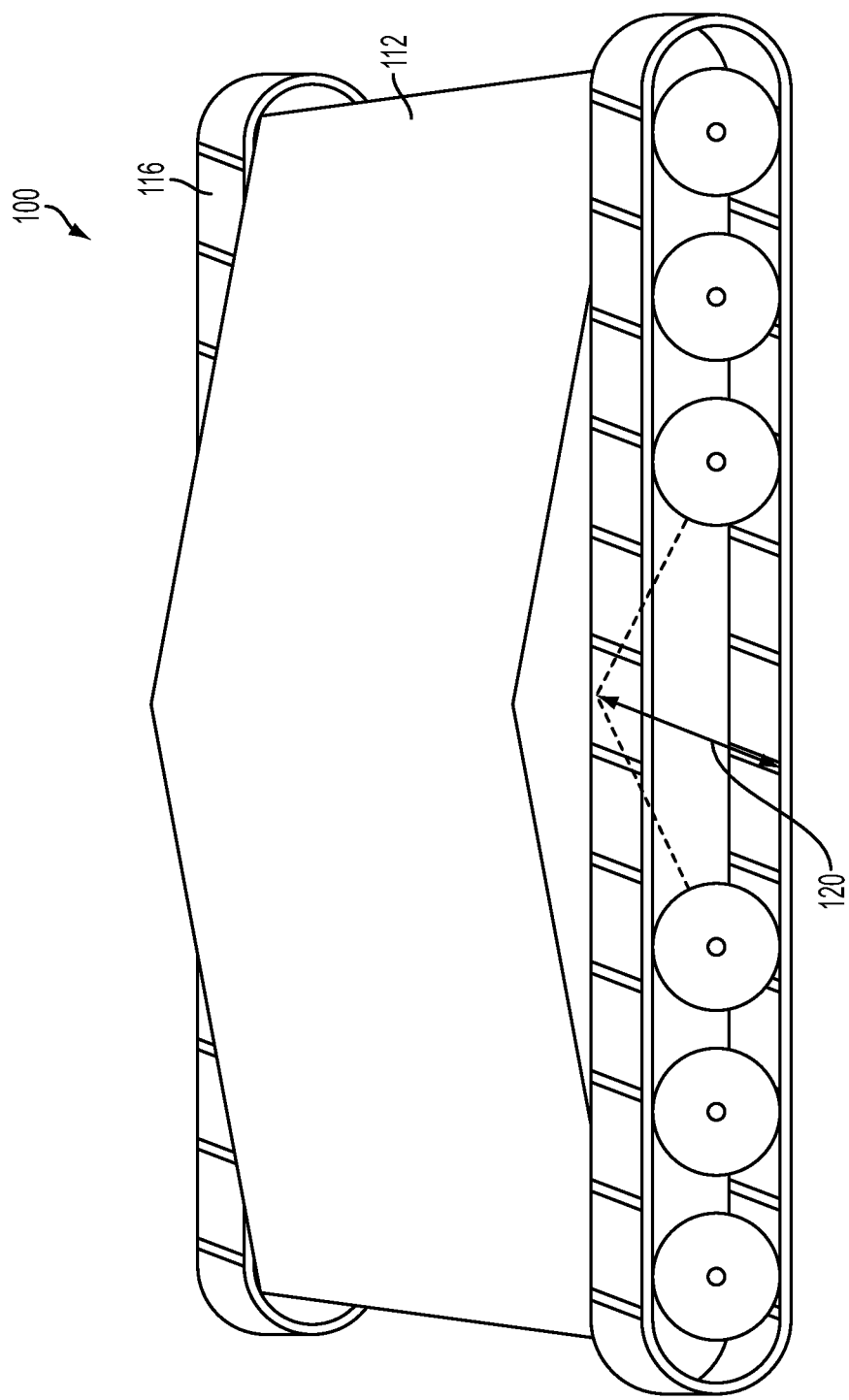

FIG. 6 is a perspective illustration of a vehicle supported by tracks, according to particular embodiments.

Figure 7:
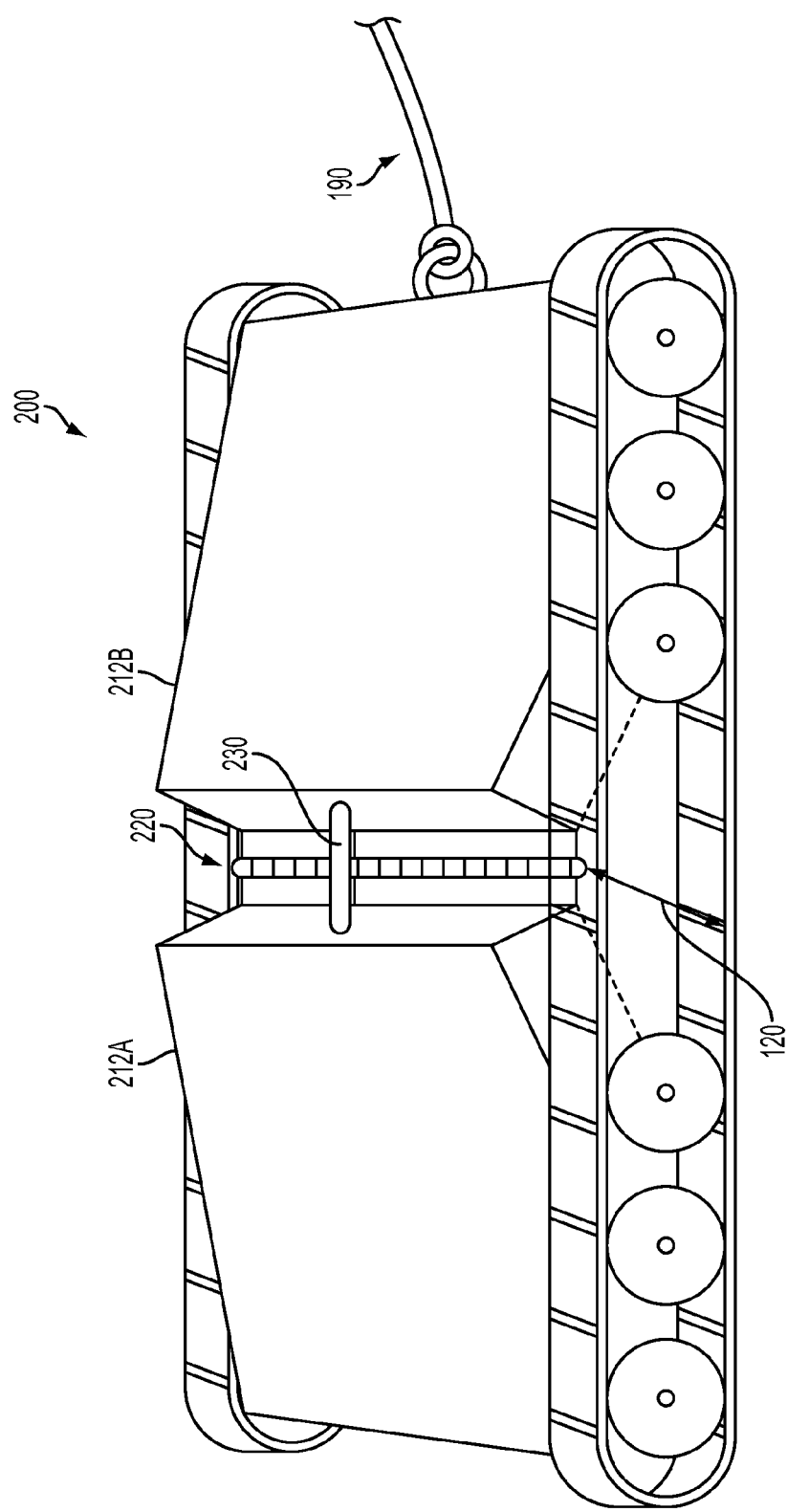

FIG. 7 is a perspective illustration of a vehicle, according to a second embodiment.

Figure 8:
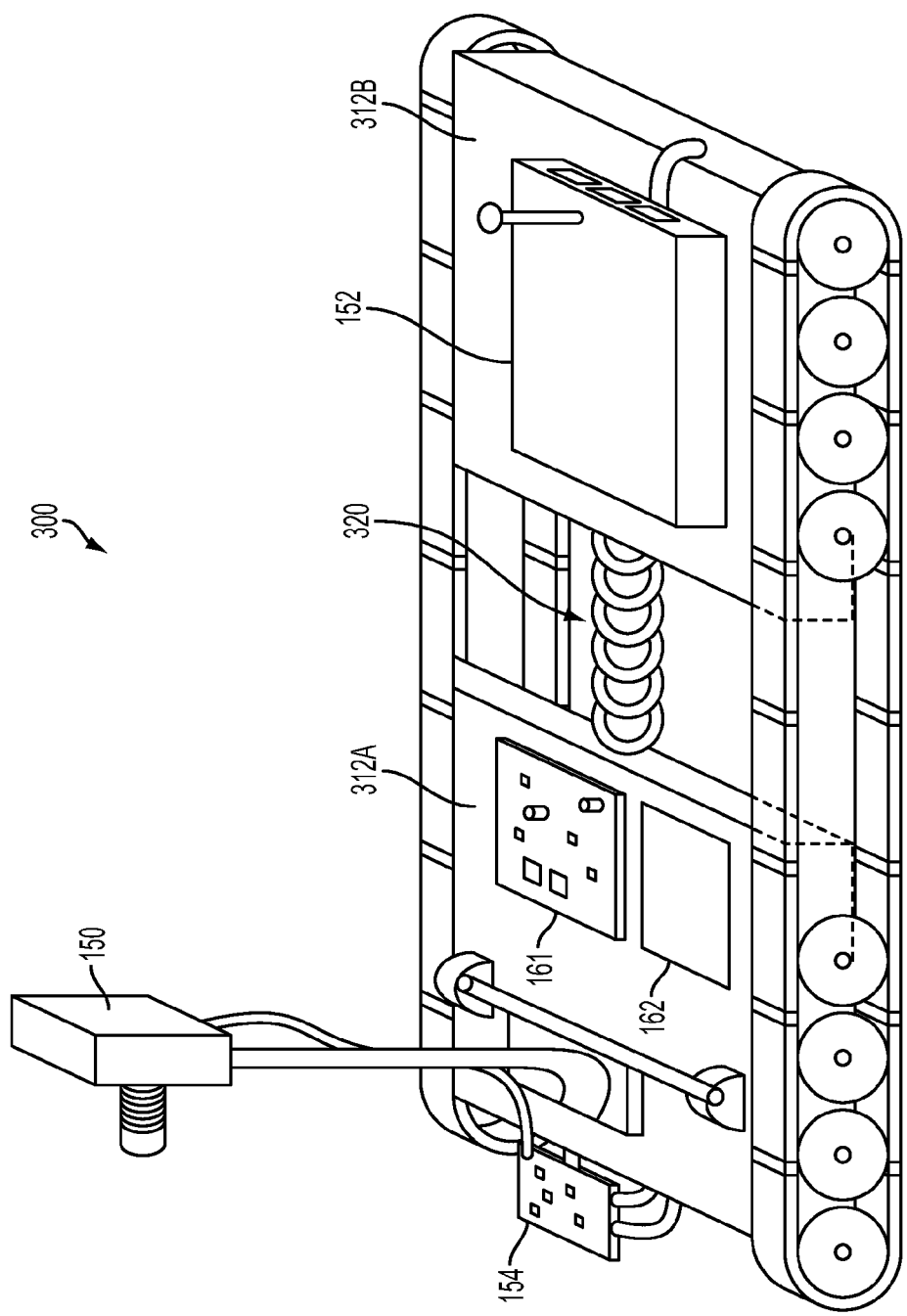

FIG. 8 is a perspective illustration of a vehicle, according to a third embodiment.

Figure 9:
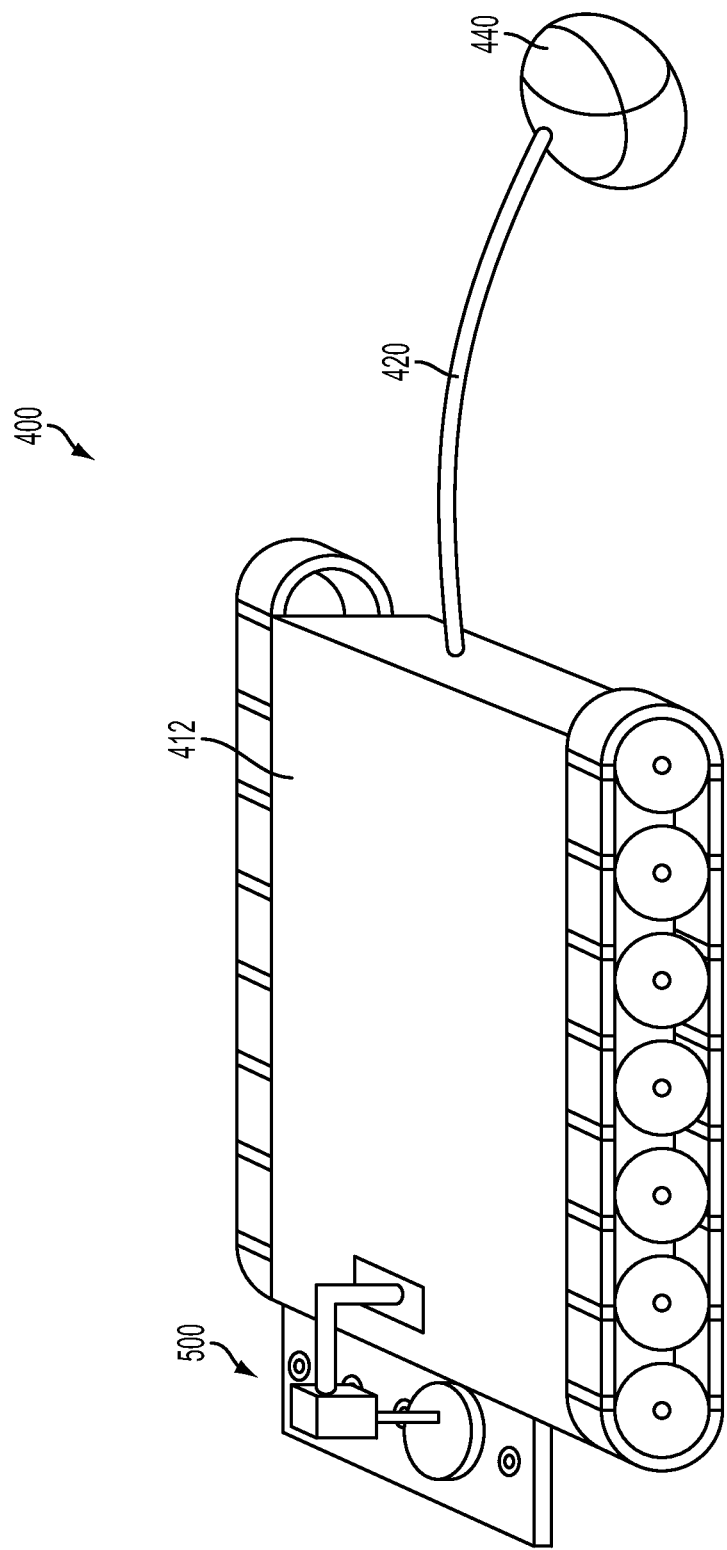

FIG. 9 is a perspective illustration of a vehicle, according to a fourth embodiment.

Figure 10:
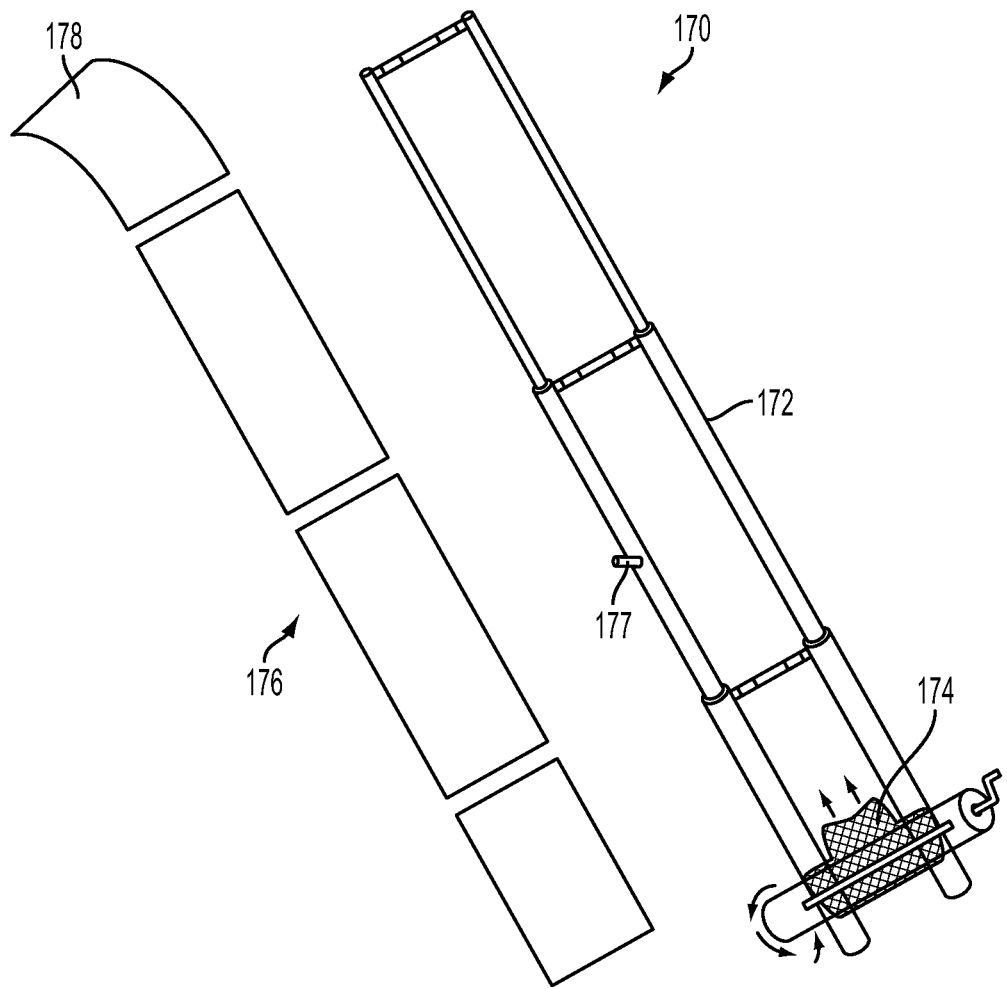

FIG. 10 is a perspective, partially exploded illustration of a lift system for a vehicle, according to particular embodiments.

Figure 11:
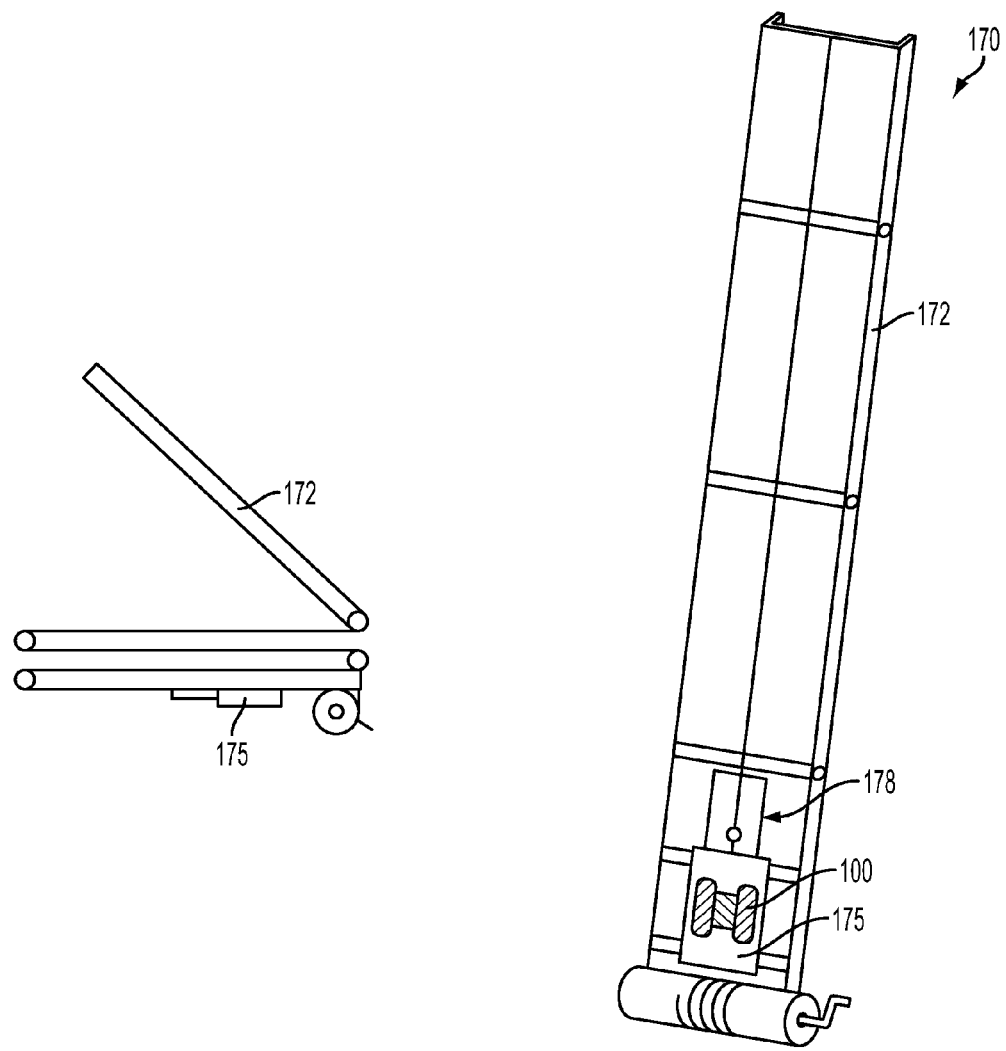

FIG. 11 is a pair of perspective illustrations of a lift system for a vehicle, according to an alternative embodiment.

Figure 12:
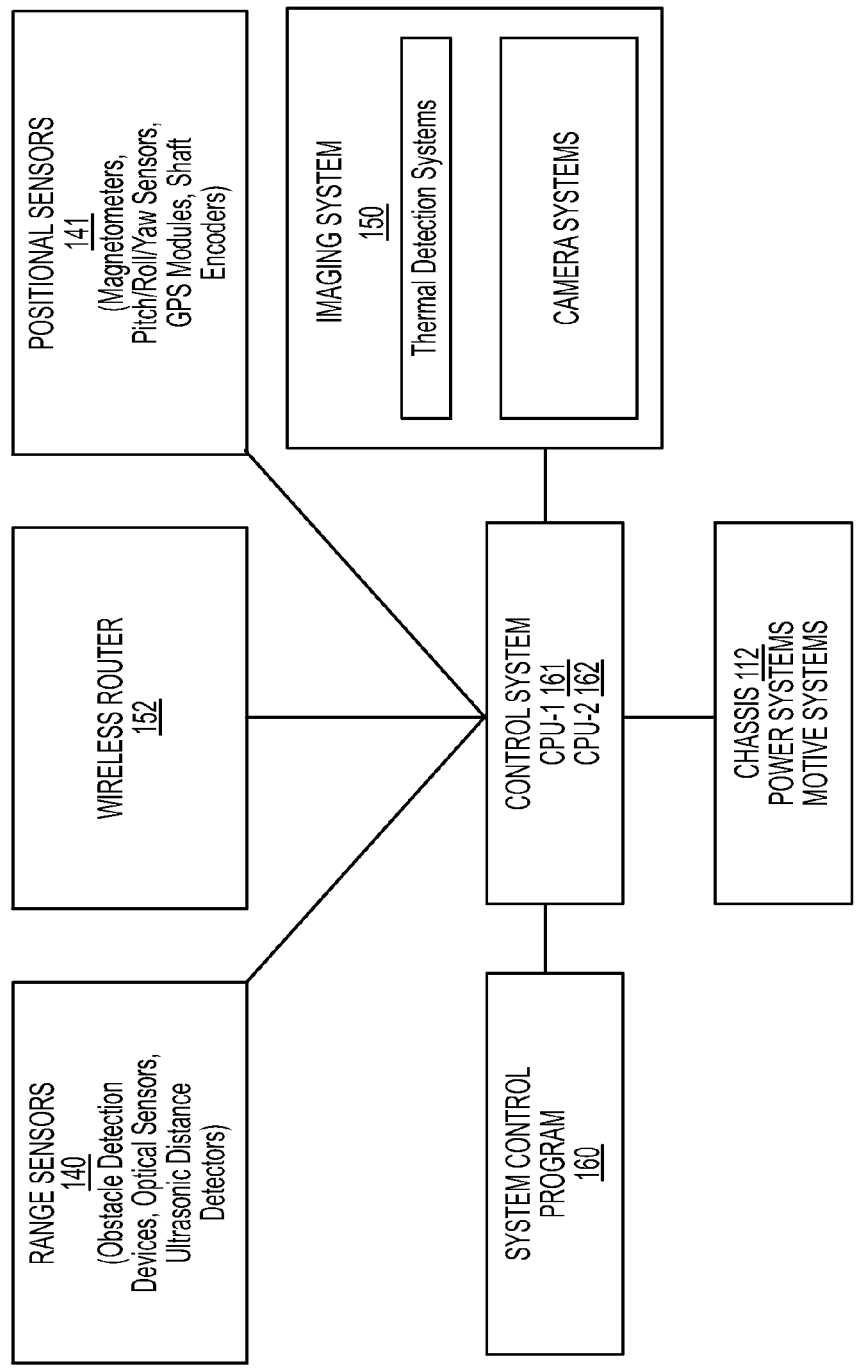

FIG. 12 is a system hardware diagram, according to particular embodiments.

FIGS. 13 through 25 are flow charts describing various routines in a system control program, according to particular embodiments.

Figure 26:
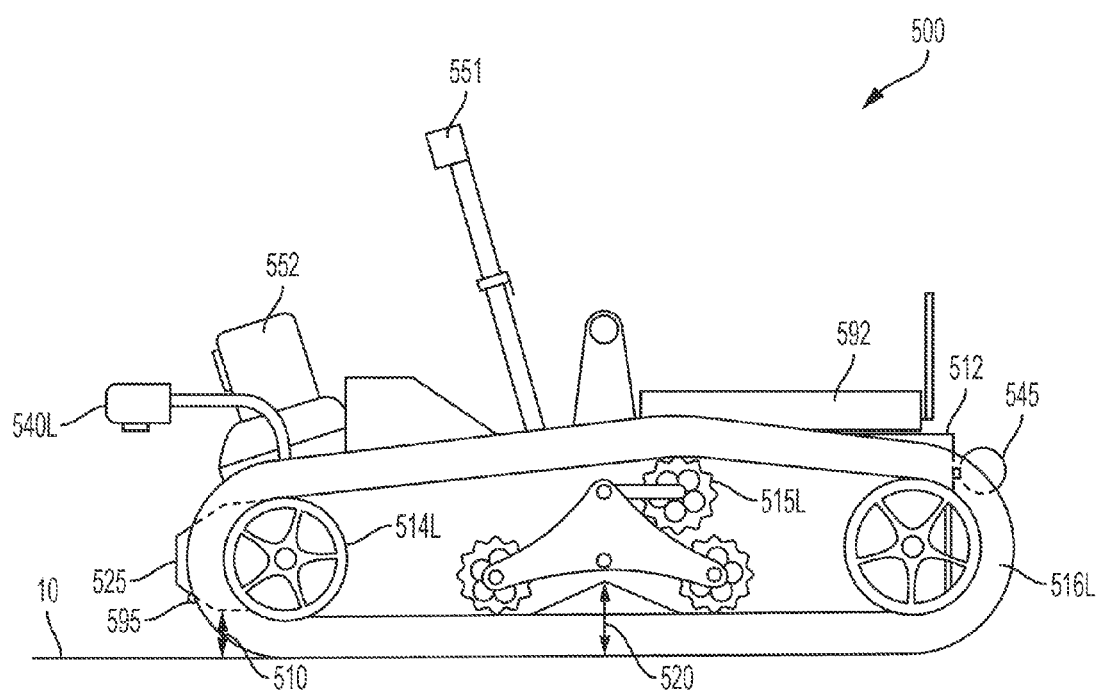

FIG. 26 is a side illustration of a vehicle, according to a fifth embodiment.

Figure 27:
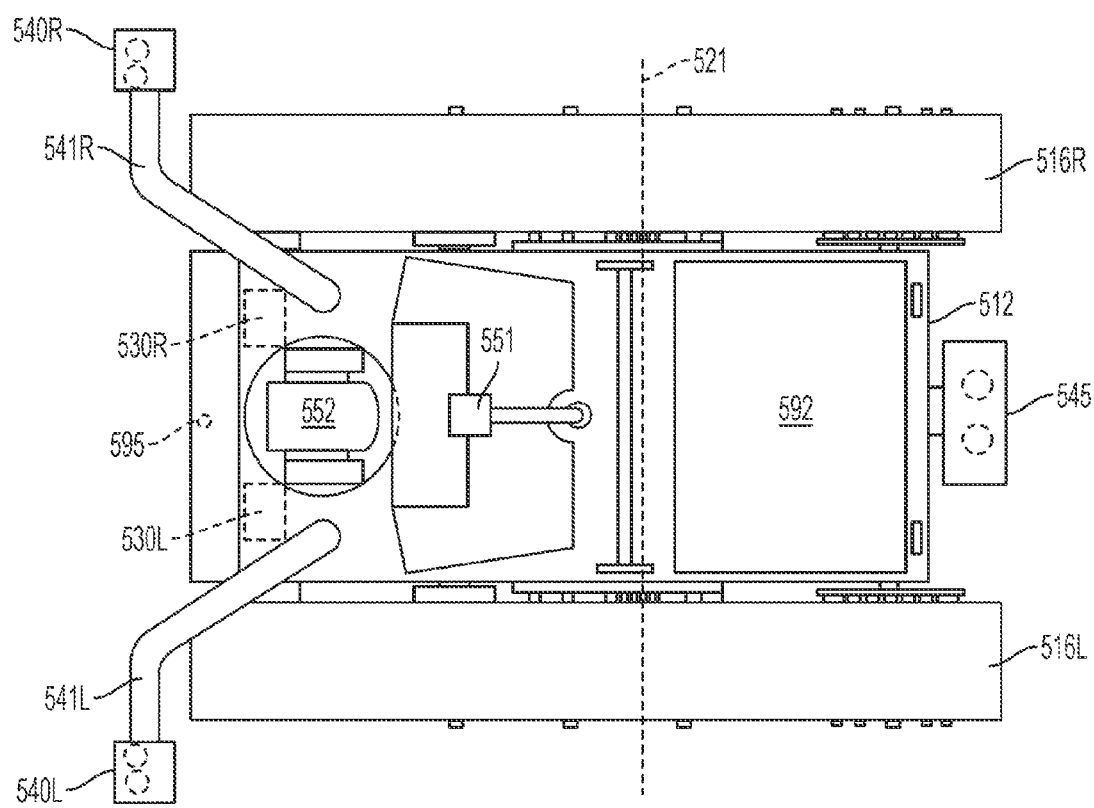

FIG. 27 is an overhead or plan-view illustration of a vehicle, according to the fifth embodiment.

Figure 28:
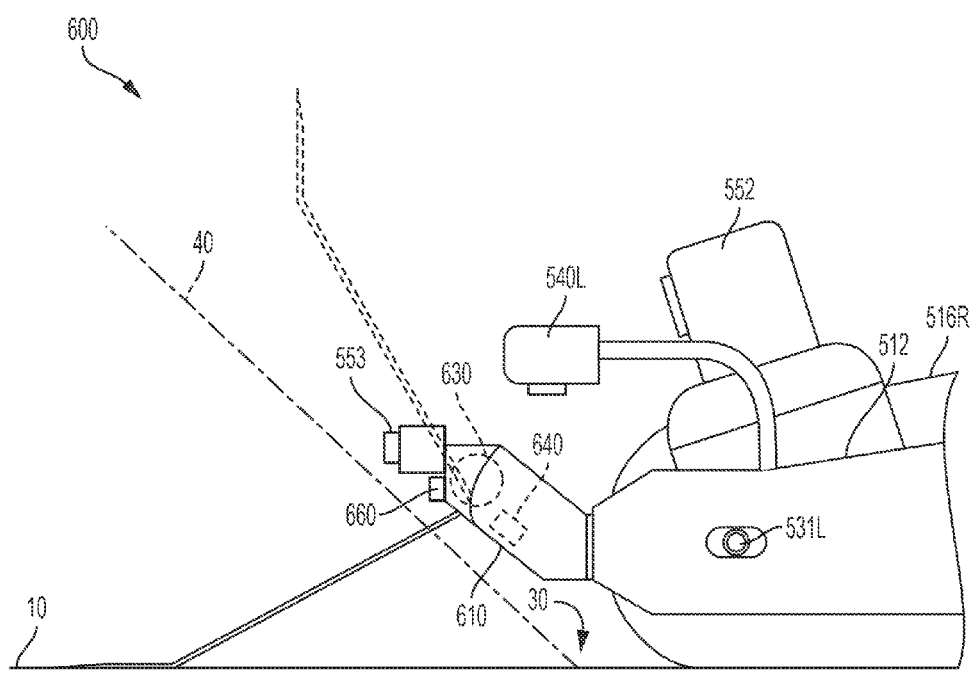

FIG. 28 is a side view of a shingle lifter attached to the front end of the chassis of a vehicle.

Figure 29:
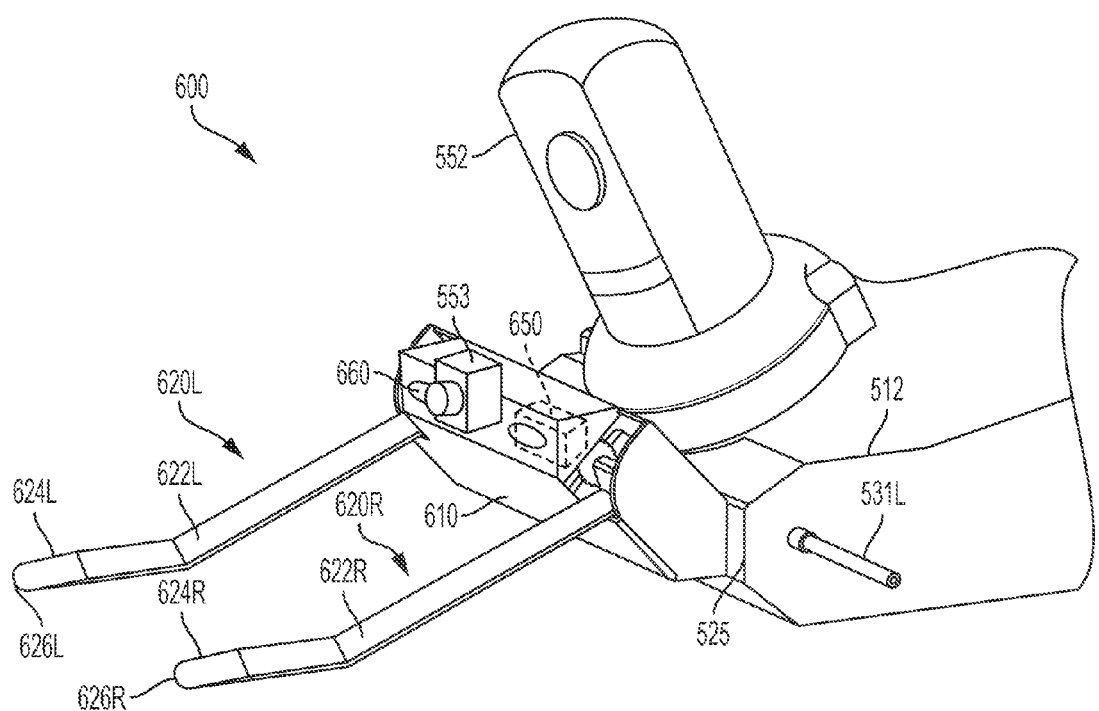

FIG. 29 is a perspective view of a shingle lifter attached to the front end of the chassis of a vehicle.

Figure 30:
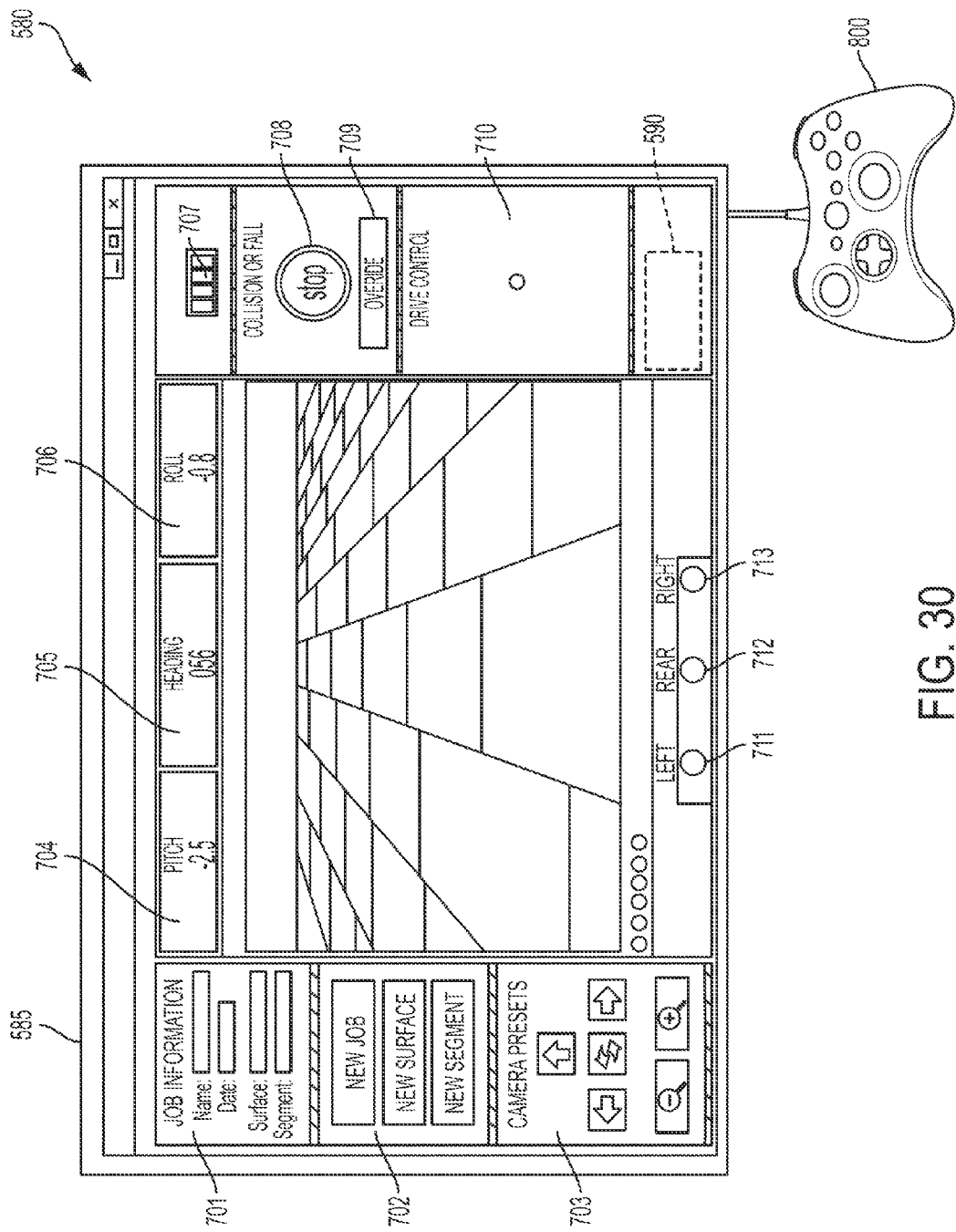

FIG. 30 is a schematic illustration of a remote console, comprising a tablet computer and a controller, according to various embodiments.

DETAILED DESCRIPTION

The present systems and apparatuses and methods are understood more readily by reference to the following detailed description, examples, drawing, and claims, and their previous and following descriptions. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching in its best, currently known embodiment. To this end, those skilled in the relevant art will recognize and appreciate that many changes can be made to the various aspects described herein, while still obtaining the beneficial results of the technology disclosed. It will also be apparent that some of the desired benefits can be obtained by selecting some of the features while not utilizing others. Accordingly, those with ordinary skill in the art will recognize that many modifications and adaptations are possible, and may even be desirable in certain circumstances, and are a part of the invention described. Thus, the following description is provided as illustrative of the principles of the invention and not in limitation thereof.

As used throughout, the singular forms "a," "an" and "the" include plural referents unless the context clearly dictates otherwise. Thus, for example, reference to "a" component can include two or more such components unless the context indicates otherwise. Also, the words "proximal" and "distal" are used to describe items or portions of items that are situated closer to and away from, respectively, a user or operator. Thus, for example, the tip or free end of a device may be referred to as the distal end, whereas the generally opposing end or handle may be referred to as the proximal end.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Vehicle

According to a particular embodiment, a vehicle adapted for traversing and inspecting an irregular terrain, such as a roof, includes a chassis, a motive system, a power system, an imaging system, a sensor system, and a control system. Optionally, the vehicle may include an impression system 500 for taking and recording a physical impression or imprint of an area of interest.

In one type of use, the vehicle may be placed on the roof of a building to traverse and inspect the condition of the roof. The control system may include an autonomous mode with a guidance program and/or a manual mode with a remote console with user interface controls for directing the vehicle from a location remote from the roof.

Chassis

The chassis in particular embodiments is sized and shaped to traverse steep slopes and cross abrupt pitch changes such as roof peaks without damaging or overturning the vehicle.

As shown in FIG. 1, a vehicle 100 according to a first embodiment includes a chassis 112 supported by a pair of flexible, continuous tracks (left track 116L is shown) mounted on opposing left and right sides of the chassis. Each track is engaged with at least one driven sprocket 114 and at least one free sprocket or idler 115. The chassis 112 has opposing front and rear ends, an upper deck and a generally opposing bottom surface. In various embodiments, the bottom surface defines a relatively low ground clearance. The low ground clearance helps keep the vehicle's center of mass low (sometimes called the "center of gravity"), which helps prevent the vehicle from overturning when traversing irregular terrain. The center of mass, or barycenter, may be defined as the weighted average location of all the mass particles of a body.

The bottom surface defines a first clearance 110 near the front end, as shown in FIG. 1. The clearance may be similar near the rear end. The bottom surface also defines a second clearance 120 at an intermediate location, which may or may not be near the center of mass, or near the lengthwise midpoint, of the chassis 112. The second clearance 120 may be described as lying along an intermediate, substantially transverse axis 121 (shown in FIG. 5) relative to the longitudinal axis of the chassis 112. As shown, the second clearance 120 is substantially greater than the first clearance 110, where the clearances are measured relative to a substantially planar surface 10. A perspective view of a vehicle 100 is illustrated in FIG. 6. As shown, the chassis 112 is supported by tracks 116 and the second clearance 120 is located at an intermediate location relative to the front and rear ends of the chassis 112. As illustrated, the bottom surface of the chassis 112 has a fixed camber angle where the second clearance 120 is located.

In one exemplary embodiment, the vehicle is about 20.5 inches long, 15 inches wide, and 5 inches high at the top of the chassis. The lens assembly 156 is positioned at a height of about 8 inches. The first clearance 110 in this embodiment is 0.25 inches, and the second clearance is 1.00 inch. Accordingly, in this embodiment, the second clearance is about four times greater than the first clearance.

Several alternative embodiments of the chassis preserve the general relationship of the first clearance 100 to the second clearance 120. For example, a second embodiment of the vehicle 200 is illustrated in FIG. 7. As shown, the chassis includes a fore sub-chassis 212A and a rear sub-chassis 212B connected by one or more hinges 220. The motion of the two sub-chassis 212A, 212B about the hinges 220 may be limited by one or more limiters 230. The hinges 220, as shown, may lie along an intermediate, substantially transverse axis relative to the longitudinal axis of the chassis. The second clearance 120 may be located at or near the hinges 220. In an alternative embodiment that is not limited to the particular chassis configuration illustrated in FIG. 7, the vehicle may also include an attachment point for an auxiliary rope 190. The vehicle may be used to maneuver the rope 190 around a supporting feature on the roof, such as a chimney. Once secure, the free end of the rope 190 may be used to assist a person in climbing onto the roof and/or provide a safety precaution while a person is walking on the roof Another alternative embodiment of the chassis also preserves the general relationship of the first clearance 100 to the second clearance 120. A third embodiment of the vehicle 300 is illustrated in FIG. 8. As shown, the chassis includes a first sub-chassis 312A and a second sub-chassis 312B connected by one or more springs 320. The motion of the two sub-chassis 312A, 312B about the springs 320 may be limited by one or more limiters (not shown). The springs 320, as shown, may lie along or parallel to the longitudinal axis of the chassis. The springs 320 may allow both linear and rotational motion between the two sub-chassis in all three directions. The second clearance 120 may be located at or near the springs 320, as shown, where there is no bottom surface of any chassis element to limit the height of the second clearance.

A fourth embodiment of the vehicle 400 is illustrated in FIG. 9. As shown, the chassis 412 is unitary, with no sub-chassis elements or apparent camber to the bottom surface. The vehicle 400 includes a counterweight 440 separated from the chassis 412 and attached to a tether 420. In this alternative embodiment, the tracks may be substantially rigid instead of flexible, and the tracks may or may not include a partially collapsible tread. The counterweight 440 provides stability in a variety of situation, including when the vehicle 400 crosses a peak. In an alternative embodiment that is not limited to the particular chassis configuration illustrated in FIG. 9, the vehicle may also include an impression system 500, which is described in greater detail below.

A fifth embodiment of a vehicle 505, according to particular embodiments, is shown in FIG. 26. As shown, in a side view, the chassis 512 in this embodiment is supported above a surface 10 by a pair of flexible, continuous tracks (left track 516L is shown) mounted on opposing left and right sides of the chassis 512. Each track is engaged with at least one driven sprocket (left sprocket 514L is shown) and at least one free sprocket 515L. In this embodiment, the free sprocket 515L comprises an idler assembly having a plurality of free sprockets, one or more of which may be engaged with the track during operation.

The chassis 512 has a front end 525 and rear end, an upper deck and a generally opposing bottom surface. As shown in FIG. 26, the bottom surface of the chassis 512 may be shaped so that the distance above the surface 10, referred to as a clearance, is relatively low near the front and rear ends of the chassis, and relatively higher at an intermediate location. The bottom surface, as shown, defines a first clearance 510 near the front end 525 and a second clearance 520 at an intermediate location. The intermediate location may or may not be near the center of mass, or near the lengthwise midpoint, of the chassis 512. The second clearance 520 may be described as lying along an intermediate, substantially transverse axis 521 (shown in FIG. 27, an overhead view) relative to a longitudinal axis of the chassis 512. As shown in FIG. 26, the second clearance 520 is substantially greater than the first clearance 510, where the clearances are measured relative to a surface 10. According to particular embodiments, the first clearance 510 may be as low as about 0.25 inches, and the second clearance 520 may be as high as 1 inch.

In an alternative embodiment, the bottom surface of the chassis 512 may be shaped so that the clearance, or distance above the surface 10, is substantially equal along the entire length of the chassis 512. For a vehicle having a bottom surface that does not include different clearances at different locations, the vehicle 505 may be stabilized when traversing irregular terrain by the partially collapsible treads, as illustrated generally in FIG. 4 and described herein.

Power System

The vehicle in various embodiments includes a power system for providing energy to all the onboard systems. The power system may include one or more batteries, replaceable and/or rechargeable, and configured to cooperate with and deliver power to the various onboard systems described herein.

Motive System

The motive system, according to particular embodiments, includes a track system similar to a military tank or a tracked construction vehicle. As described herein and shown in FIG. 1, the chassis 112 may be supported by a pair of flexible, continuous tracks 116 mounted on opposing sides of the chassis 112. Each track 116 is engaged with at least one driven sprocket 114 that, when rotated, imparts motion to the track 116 and to the vehicle 100. The tracks 116L, 116R (left and right) may be made of elastomeric material such as rubber, for flexibility, adhesion and good traction.

As shown in FIG. 5, the motive system in one embodiment includes one or more drive motors 130 connected to and engaged with one of the driven sprockets 114. In the embodiment illustrated in FIG. 5, there are four drive motors 130, each one engaged with a driven sprocket. Each track 116L, 116R, may be driven independently by one or more motors. Independent motor control facilitates tight-radius turns and precise navigation around obstacles.

As shown in FIG. 2, the motive system in one embodiment also includes a partially collapsible tread (left tread 118L is shown) that is attached along the length of each track (left track 116L is shown). The partially collapsible treads 118L, 118R are also illustrated in plan view in FIG. 5.

Many who are unfamiliar with the field of roofing and roof inspections do not realize that most roof surfaces are extremely abrasive. For example, a simple rubber wheel would quickly deteriorate and fall apart after simply rolling across asphalt shingles a number of times. For such a hostile surface, the partially collapsible treads 118L, 118R provide better durability, flexibility, adhesion, and improved traction relative to other types of treads. In one exemplary embodiment, the partially collapsible treads 118L, 118R are between 1 and 2 inches thick, and are made of a cellular foam rubber material. In one embodiment, the treads 118L 118R include a selectively releasable adhesive layer on one side, to allow quick and easy replacement with new treads in the field, whenever necessary.

The treads 118L, 118R are partially collapsible, which means of course that the material will collapse or compress in response to a force, and then expand when such a force is removed. For example, the left tread 118L as shown in FIG. 2 is positioned lengthwise along the left track 116L, and the vehicle 100 is not located on a surface of any kind. The left tread 118L is generally expanded, fully and relatively evenly, around the entire perimeter of the left track 116L. In FIG. 3, however, when the vehicle 100 is placed on a surface, the left tread 118L partially collapses against the surface in response to the weight of the vehicle 100.

In addition to providing better durability and improved traction, the treads 118L, 118R cooperate with the relatively low ground clearances 110, 120 (shown in FIG. 1) in order to keep the vehicle 100 stable when traversing steep slopes, crossing abrupt pitch changes, or otherwise traveling on irregular terrain. For example, as illustrated in FIG. 4, the vehicle 100 is crossing the peak 20 of a roof or other structure. As shown, the peak 20 urges the flexible left track 116L—and the partially collapsible left tread 118L—toward the bottom surface of the chassis 112 near the second clearance 120. Both the relatively high second clearance 120 and the flexibility of the partially collapsible left tread 118L help the vehicle 100 maintain a low center of mass relative to the peak 20 during this maneuver. By keeping low relative to the peak 20, the vehicle 100 is less likely to overturn. Also, the partially collapsible left tread 118L remains generally expanded—and in contact with the surface—on both sides of the peak 20. In this aspect, the expandability of the left tread 118L helps the vehicle 100 maintain good traction with the surface during such a maneuver. By improving traction at the peak 20, the vehicle 100 is less likely to overturn.

The motive system, according to particular embodiments, as shown in FIG. 26 and FIG. 27, includes a chassis 512 supported by a pair of flexible, continuous tracks 516L, 516R mounted on opposing sides of the chassis 512. The tracks 516L, 516R may be made of elastomeric material such as rubber, for flexibility, adhesion, and good traction. The motive system may includes one or more drive motors connected to and engaged with one or more of the driven sprockets. In the embodiment shown in FIG. 26 and FIG. 27, the drive motors may include two independent drive motors 530L, 530R each engaged with its respective drive shaft 531L, 531R that moves its respective driven sprocket 514L, 514R on each side of the chassis 512. Each sprocket 514L, 514R imparts motion to its respective track 516L, 516R and to the vehicle 505. In this aspect, the motors 530L, 530R may be engaged independently to steer or turn the vehicle 505 during operation. Independent motor control facilitates tight-radius turns and precise navigation around obstacles.

According to particular embodiments, the motive system may include wheels mounted on opposing sides of the chassis instead of tracks. The motive system may include one or more drive motors connected to and engaged with one or more wheels, to propel the vehicle. Each wheel may also include a partially collapsible tire or tread. Referring to FIG. 26, the chassis 512 may be supported by the wheels, as shown, but without the tracks and without the idler sprocket. The partially collapsible tires or treads, when mounted onto the outer surface of the wheels, may provide better durability, flexibility, adhesion, and traction relative to wheels alone. The partially collapsible tires or treads may be made of a cellular foam rubber material, and may include a selectively releasable adhesive layer on the inner side.

Imaging System

The imaging system 150 in particular embodiments may be configured to provide still images and/or video, mono or stereo, transmitted in real-time and/or recorded on accessible media for later retrieval and analysis.

As shown schematically in FIG. 1, the imaging system 150 in one embodiment includes a main imaging assembly 154, a lens assembly 156, and a wireless router 152. Unlike most imaging systems, the lens assembly 156 is separated from the main imaging assembly 154 and mounted above the chassis 112 on a pole or other suitable structure. The lens assembly 156 is mounted relatively high in order to capture high-quality images of the roof surface. The main imaging assembly 154, which contains the heavier components and system elements, is mounted lower, on or near the chassis 112, in order to help keep the vehicle's center of mass low. In this aspect, the separation of elements of the imaging system 150 helps the vehicle 100 maintain good traction when traversing steep slopes or crossing the peak 20 of a roof, as illustrated in FIG. 4.

The main imaging assembly 154 may be connected via a network cable to a wireless router 152, which may be mounted to the chassis 112, as shown in FIG. 1. In this embodiment, the wireless router 152 may be dedicated to transmitting the images or data from the vehicle 100 to a remote computer 185 (FIG. 5), where a user or operator may view a video stream of the captured images, in real-time, during an inspection.

The imaging system 150 may include its own onboard data storage and/or it may be connected to the other onboard systems where the images or data can be stored for later use. In this aspect, the camera system makes a persistent visual record of the subject roof, thereby allowing people and companies with potentially competing interests the opportunity to review an objective record of the roof condition.

If the imaging system 150 includes a pair of cameras, the cameras will be synchronized in order to produce accurate stereographic images. Stereographic images may also be created virtually, by using select images from a single camera. Use of stereographic imaging apparatus will facilitate the later technical analysis of the images and should allow detection of the size and shape of roof features, such as the dents caused by hail. For example, hail makes a characteristically somewhat hemispherical depression, while minor heat blistering produces a raised area like a bubble. Closed heat blisters make a bubble in the granules of the shingle. Open heat blisters expose the underlying mat of the shingle.

The imaging system 150 may also include thermal or heat-sensing systems for detecting areas of trapped moisture, areas of heat loss (suggesting poor insulation). Detecting the heat signature from a roof can produce, for example, a map of the relative heat loss taking place in different areas of the roof. As shown in FIG. 26, the imaging system may include a temperature sensor 595 mounted, in this embodiment, below the front end 525 of the chassis 512 so that it is positioned near the surface 10. The temperature sensor 595 may be infrared and may be mounted near the center of the chassis 512 or at any other location suitable for capturing a reliable and accurate temperature reading for the surface 10.

The imaging system 550, as shown in FIG. 26, may include a driving camera 551 mounted on a mast and an inspection camera 552 positioned near the front end 525 of the chassis 512. As shown, the mast supporting the driving camera 551 may be adjustable in height, and angled to provide a general and overall view of the vicinity, to support the user in safely driving the vehicle 505. The driving camera 551 may include a driving lens assembly mounted at or near the top of the mast, and a driving imaging assembly that is mounted lower, on or near the chassis 512, in order to keep the vehicle's center of mass low. The driving camera 551 may include a wide-angle lens for capturing a panoramic view of the vicinity.

The inspection camera 552 may be a high-resolution pan/tilt/zoom (PTZ) camera that can be controlled by the user to inspect particular locations of interest in the vicinity, such as on the surface 10 of a roof. The remote console 580, as described herein, may have a user interface that enables the user to control the angular position (pan and tilt) and magnification (zoom) of the inspection camera 552.

The imaging system 550 may be connected via network cable or other connection to a wireless router 592, which may be mounted to the chassis 512, as shown in FIG. 26 and FIG. 27. In this embodiment, the wireless router 592 may be dedicated to transmitting the images or data from the vehicle 505 to a remote computer, where a user or operator may view a video stream of the captured images, in real-time, during an inspection.

The vehicle 505, in particular embodiments, may include shingle lifter 600 that can be attached to the front end 525 of the chassis 512, as illustrated in FIG. 28 and FIG. 29, and described herein. The imaging system 550, in this embodiment, may include a lifter camera 553 that is supported by the housing 610.

Sensor System

The sensor system in particular embodiments may include positional sensors 141 for location and navigation, and range sensors 140 for sensing various features on a roof, such as obstacles and roof edges.

The positional sensors 141 may include a digital compass for sensing the vehicle's position, orientation, and heading relative to the earth. For example, the vehicle may include onboard a Honeywell HMC5843 digital compass with three-axis magneto-sensitive sensors and an application-specific integrated chip with an interface for communicating with other systems.

The positional sensors 141 may also include a sensor for measuring pitch, roll, and yaw. For example, the vehicle may include onboard an InvenSense ITG-3200 integrated three-axis angular-rate sensors (gyroscopes) with digital output for communicating with other systems.

The positional sensors 141 may also include a GPS module for determining the vehicle's position relative to the satellites in the Global Positioning System. For example, the vehicle may include onboard a U-Blox LEA-5H GPS receiver module with a built-in antenna, a built-in Flash memory, and an interface for communicating with other systems.

The positional sensors 141 may also include one or more distance-measuring sensors configured to precisely measure the distance traveled by the vehicle. For example, the vehicle may include onboard an optical shaft encoder 145 such as an incremental 1000-line shaft encoder, which senses the number of revolutions of a shaft (such as an axle), which can then be converted into the linear distance traveled by the vehicle. In FIG. 5, an optical shaft encoder 145 is shown, schematically, in position near a front axle of the vehicle 100.

The range sensors 140 may include any of a variety of suitable sensors, such as optical sensors, ultrasonic sensors, or radio-frequency sensors. For example, the vehicle may include onboard an ultrasonic range sensor such as the Parallax Ping ultrasonic distance detector that measures distances using sonar and interfaces with micro-controllers for communicating with other systems.

In one embodiment, the vehicle 100 is equipped with eight (8) ultrasonic range sensors 140, positioned near the outboard edges of the vehicle 100 and directed in all three axis directions (x, y, z) in order to sense the surrounding environment in all three dimensions.

In a fifth embodiment, as illustrated in FIG. 26 and FIG. 27, the vehicle 505 may be equipped with two front range sensors 540L, 540R near the front of the vehicle 505 and a rear range sensor 545 near the rear. Each range sensor is generally downward-facing and includes two ports; one for sending the signal and another for receiving. Alternatively, range sensors having a single port for both sending and receiving may be used.

Each front range sensor 540L, 540R is disposed on a boom assembly 541L, 541R, respectively, as shown in FIG. 27. Each boom assembly 541L, 541R may be mounted to the chassis 521 so that it can be rotated toward the chassis 512 for easy storage. For example, referring to FIG. 27, the left boom assembly 541L may be mounted so that it can be rotated counter-clockwise, toward the chassis 512, for storage when the vehicle 505 is not in use. Similarly, the right boom assembly 541R may be rotated clockwise toward the chassis 512. In this aspect, the boom assemblies 541L, 541R when folded lie substantially within the outermost sides of the treads 516L, 516R. The boom assemblies 541L, 541R may include a detent, a button, or another mechanical device for resisting or stopping additional rotation. For example, a detent may be positioned to provide a tactile cue to the user that each boom assembly 541L, 541R is fully in its extended position (for use) or fully collapsed (for storage). Also, each boom assembly 541L, 541R may include a locking collar, a pin, or another mechanical device for securing the boom at any particular location.

Control System

As shown in FIG. 12, the control system in various embodiments is connected to essentially all the other onboard systems. The control system may include a first microcontroller 161, a system control program 160, and a second microcontroller 162. The control system may also include a remote console 180 with its own user interface controls and a wireless transmitter. The control system, as shown in FIG. 12, may include a wireless router 152 and may be connected to the imaging system 150 and to the sensor systems, including the range sensors 140 and positional sensors 141. The wireless router 152, according to particular embodiments, may be a transceiver; that is, both a transmitter and a receiver.

The control system, generally, includes a guidance routine that causes the vehicle to traverse the roof surface in a predetermined manner, using the onboard sensor systems to avoid collisions with obstacles and to avoid falling off the roof edges.

CPU2: In one embodiment, the second microcontroller 162 (called CPU2) may include a customized printed circuit board (PCB) that runs a software loop to execute the following tasks.

1. Take a distance reading from each of the ultrasonic range sensors 140, in sequence, one after the other. A distance reading involves issuing a stimulus pulse to the sonar being interrogated, then measuring the width of the pulse that the sonar sends back. The width is directly correlated with the speed of sound and is used to calculate the representative distance of any obstacle, in any direction (i.e., ahead or behind, left or right, above or below).

2. Store the distance data from each sensor 140 in onboard memory, resident in CPU2 162.

3. Take a pitch and roll reading from the digital gyroscope, which is one of the positional sensors 141 described above, and store the values in onboard memory. In this embodiment, the chip in CPU2 162 has its own communications protocol and command set for reading the values it receives from any of the sensors 140, 141. The CPU2 162 communicates with the chip via a connection called I2C-bus.

4. Take a compass heading reading from the magnetometer (digital compass), which is also one of the positional sensors 141 described above, and store the values in onboard memory.

5. Read the incoming signals from the remote control console 180. In various embodiments, the control system includes a remote console 180 with its own user interface controls and a wireless transmitter for sending signals to the onboard control system. In one embodiment, CPU2 162 includes or is in communication with a multi-channel receiver located onboard the vehicle, and paired with a remote transmitter positioned in a remote control console 180. For example, the vehicle may include onboard a Futaba R617FS 2.4 GHz FASST seven-channel receiver, paired with a Futaba 7C seven-channel transmitter positioned in the remote control console 180. In one embodiment, CPU2 162 is configured to read the incoming signals from the remote console 180 on each of several receiver channels, obtaining the current pulsewidth of the signal. The pulsewidth of the signal varies according to the position of the channel's associated joystick (gimbal) or switch position located on the remote console 180. In one embodiment, one of the onboard receivers sends a digital pulse several times a second, and has a pulsewidth of about 1.0 to 2.0 milliseconds. The signals from the remote console 180 are received by CPU2 162 and processed using software and various timers on the CPU2 162.

6. Store the incoming pulsewidths from the remote console 180 in onboard memory.

7. Interrogate the first microcontroller 161 (called CPU1) to determine if CPU1 161 has issued any instructions (e.g., right motor on, left motor off) and, if so, execute those instructions.

In a preferred embodiment, the onboard processing is distributed between CPU1 161 and CPU2 162 in order to facilitate the smooth and timely operation of the vehicle 100. For example, in one embodiment, CPU1 161 is primarily dedicated to making decisions (using the system control program 160, for example), whereas CPU2 162 is primarily dedicated to gathering sensor data and remote control signals. Other existing robotic systems that rely on a single onboard computer to both gather data and process instructions would be overwhelmed and "freeze" in response to the myriad of slopes, obstacles, and edges that are typically encountered on a roof. The solution described herein includes distributed processing between two processors, CPU1 161 and CPU2 162.

8. Interrogate the first microcontroller 161 (called CPU1) to determine if CPU1 161 has issued any request for data (e.g., get compass heading, get GPS location) and, if so, retrieve the requested data from the CPU2 onboard memory and send the requested data to CPU1.

9. Return to task 1 above and repeat, in a continuous loop.

CPU1: In one embodiment, the first microcontroller 161 (CPU1) also runs a software loop to execute its own set of tasks.

1. Request from CPU2 the latest distance readings from each of the ultrasonic range sensors 140.

2. Determine (calculate) if any of the distances represent an obstacle or a fall point (e.g., a hole or the edge of the roof) that should be avoided.

(a) If the vehicle is not moving, then no action is required, and no signal needs to be sent to CPU2.

(b) If the vehicle is moving and is operating in autonomous mode (called 'auto-nav'), then evasive action is required, and CPU1 sends a signal to CPU2 to take evasive action by turning away from the hazard. After the CPU2 readings indicate no hazard, the CPU1 sends a signal to CPU2 to stop the evasive maneuver.

(c) If the vehicle is moving and is operating in manual mode (called 'manual-nav'), then evasive action is required, and CPU1 sends a signal to CPU2 to stop—forcing the vehicle to stop, even if the operator holding the remote console is sending a contrary signal. This is called the emergency override condition. The vehicle remains stopped until the operator throws an assigned switch on the remote console, telling CPU1 to release control of the motors back to the operator (until another hazard is encountered).

3. Send a query to CPU2 to determine whether the operator has placed the vehicle in 'atuo-nav' or 'manual-nav' mode. This is accomplished by querying the pulsewidths of the receiver channels associated with the dedicated navigation mode switches on the remote console.

4. In autonomous mode (auto-nav), CPU1 may be configured to execute the following navigation routine. (a) Send a signal to CPU2 with instructions to activate one or more of the drive motors and move forward, and slightly right, at a given speed. (b) Monitor the incoming data from CPU2 from the range sensors 140, constantly evaluating whether an obstacle or fall hazard is present. (c) If a hazard is detected on the right side, then the control system assumes the vehicle has reached a perimeter boundary. (d) Take a heading, pitch, and roll reading from CPU2 and reset a distance counter to zero. (e) Begin a turn toward the left in order to avoid the hazard ahead on the right; begin measuring pulses from the optical shaft encoder 145 (FIG. 5) and accumulate the count in onboard memory. (f) After the vehicle has turned away from the hazard, begin moving forward, and slightly right, at a given speed until another hazard or boundary is encountered. (g) When a hazard is detected in center-front or left-front, CPU1 instructs CPU2 to stop the vehicle and store all the data (heading, pitch, roll, and now distance) into a memory structure in an EEPROM chip located on the CPU board. Then, the vehicle is directed to execute a pivot turn, left, until the current hazard is no longer detected. (h) Return to step (a) and repeat. This will move the vehicle counter-clockwise around the surface of the roof until the operator pushes an assigned switch on the remote console that instructs CPU1 to stop the vehicle and store all the relevant data in the onboard EEPROM chip (including, for example, the current GPS coordinates and the current GPS time and date). The data stored may also include information entered by the operator (e.g., job number, roof section number) using the user interface on the remote console.

5. In manual mode (manual-nav), the operator holding the remote console 180 is responsible for moving the vehicle about the roof surface. In one embodiment, the remote console 180 is equipped with its own user interface and input devices, such as one or more push buttons, switches, and joysticks (on gimbal mounts). For example, the remote console 180 may include a Futaba 7C seven-channel transmitter that is paired with a Futaba R617FS 2.4 GHz FASST seven-channel receiver that is in communication with CPU2. In one embodiment, gimbals on the remote console 180 are used to send signals instructing one or more of the drive motors to activate and move the vehicle in a desired direction. Any of the switches on the remote console may be assigned to a particular task. For example, a switch can be assigned to tell CPU1 to begin a new distance measurement, as described in step 4(d) above. Another switch can be assigned to tell CPU1 to store the distance measurement, as described in step 4(g) above. When the operator has finished traversing the roof, or a particular section, another switch tells CPU1 to store all the relevant data, as described in the final step, above.

6. While in manual-nav mode, the only automatic or autonomous feature of the vehicle and its onboard systems is the emergency override condition described in 2(b), above.

7. The operator does not need to measure any part of the roof. The vehicle and its onboard systems may be configured to measure distances as well as the roof pitch and the size and shape of various obstacles. The onboard imaging system may be used to record video and/or route a live video stream to a remote computer on the ground.

8. If and when measurement data has been stored, CPU1 161 may be configured to support a serial communications protocol by which a remote computer can be connected to the CPU board using a USB cable, and the stored data may be downloaded for analysis. In one embodiment, all the data from each and every segment of the roof traversed by the vehicle may be stored and downloaded. The data for each segment, for example, may include the compass heading, pitch, roll, time, date, and distance traveled. This data may be combined into a virtual outline of the roof, showing the path traveled by the vehicle. Subsequent analysis of the combined data may be used to calculate the total area, average pitch, and other characteristics of the surface.

FIGS. 13 through 25 are flow charts describing various routines in the system control program 160, according to particular embodiments.

Figure 13:
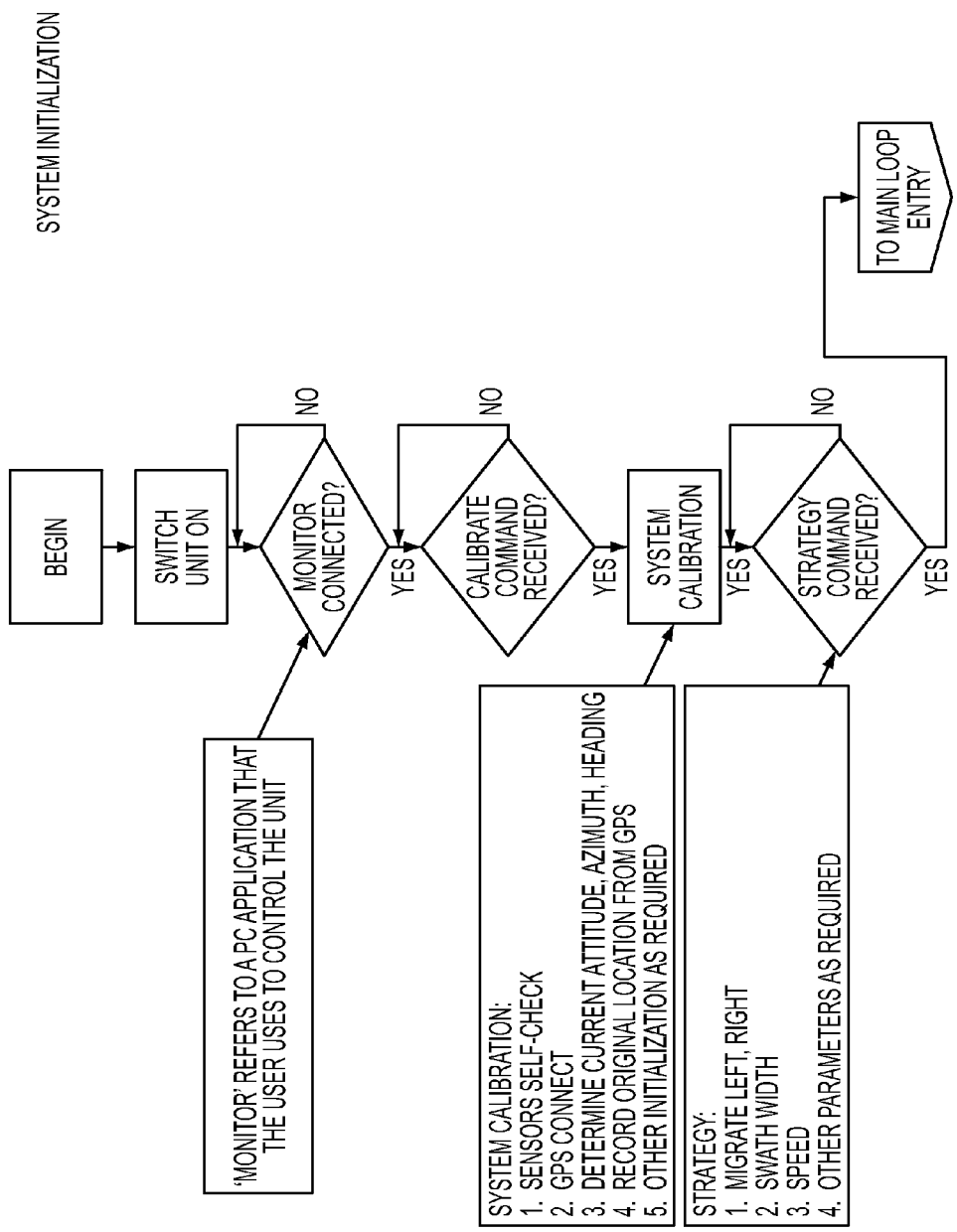

FIG. 13 is a flow chart describing the system initialization, in one embodiment. The term monitor refers to a remote computer 185 (shown in FIG. 5) which may be used to receive a streaming video feed from the vehicle. The system calibration steps may include a self-check by the sensors 140, 141, a connection to the GPS module, an initial determination of the vehicle's altitude, azimuth, and heading, an initial record of the GPS location, and any other initialization procedures required for any component. The strategy command, in one embodiment, may include a command to migrate left or right, to cover a swath of a certain width, to proceed at a predetermined speed, and/or any other commands in accordance with parameters established by the system or its operators.

Figure 14:
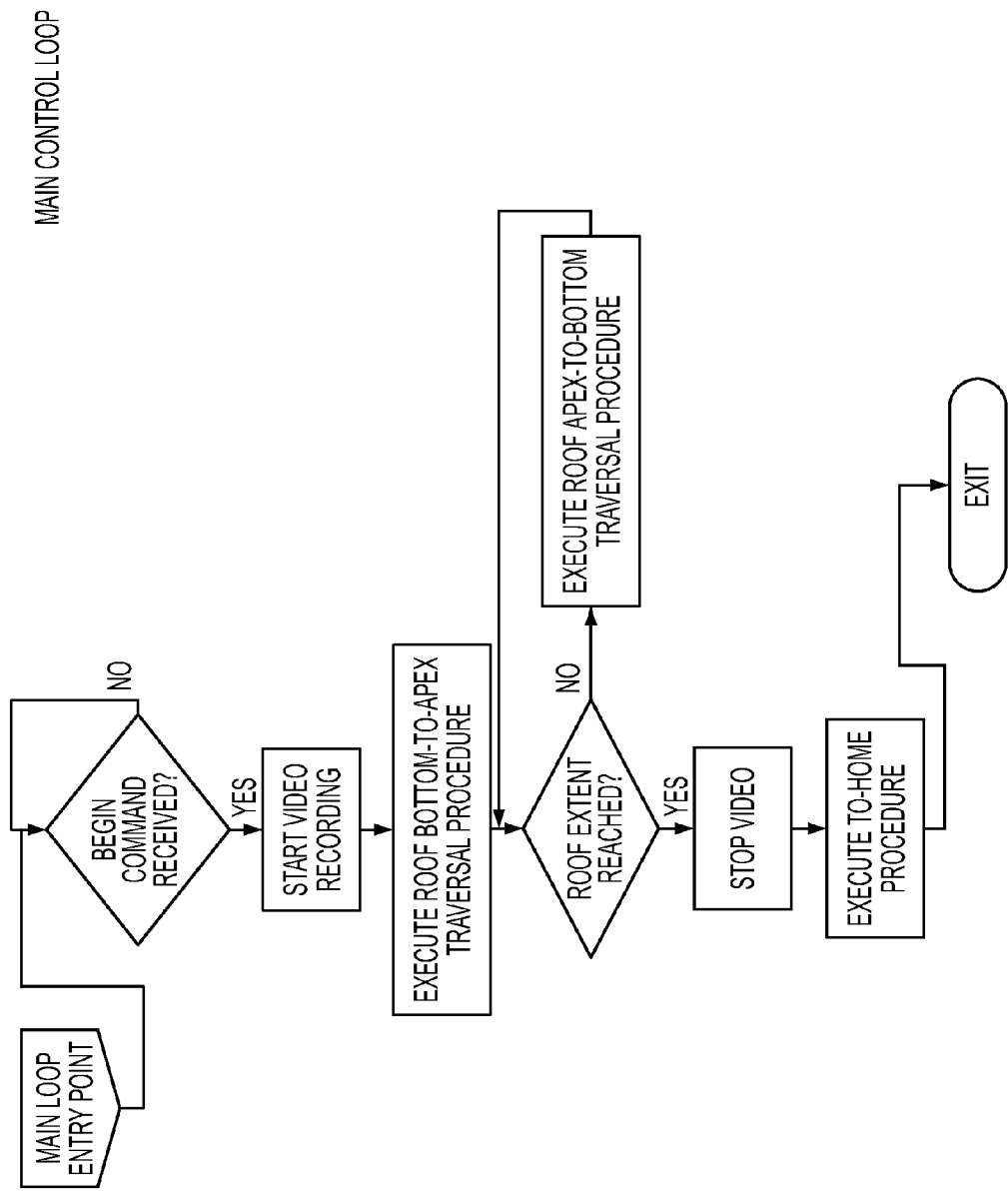

FIG. 14 is a flow chart describing the main control loop, in one embodiment. The main control loop, as shown, includes the execution of a number of distinct routines or procedures, as described in the other figures.

Figure 15:
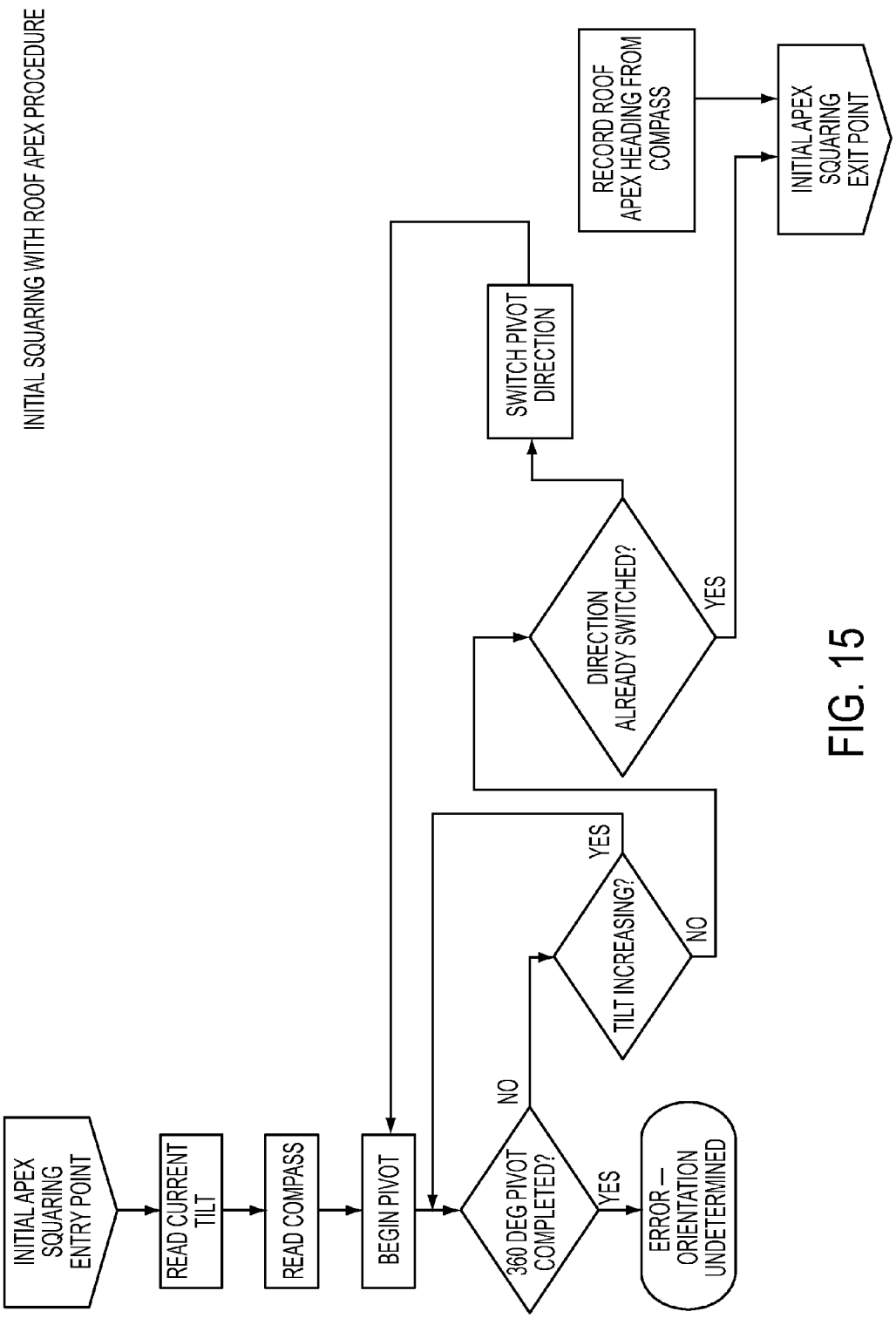

FIG. 15 is a flow chart describing a procedure called "initial squaring with roof apex," in one embodiment.

Figure 16:
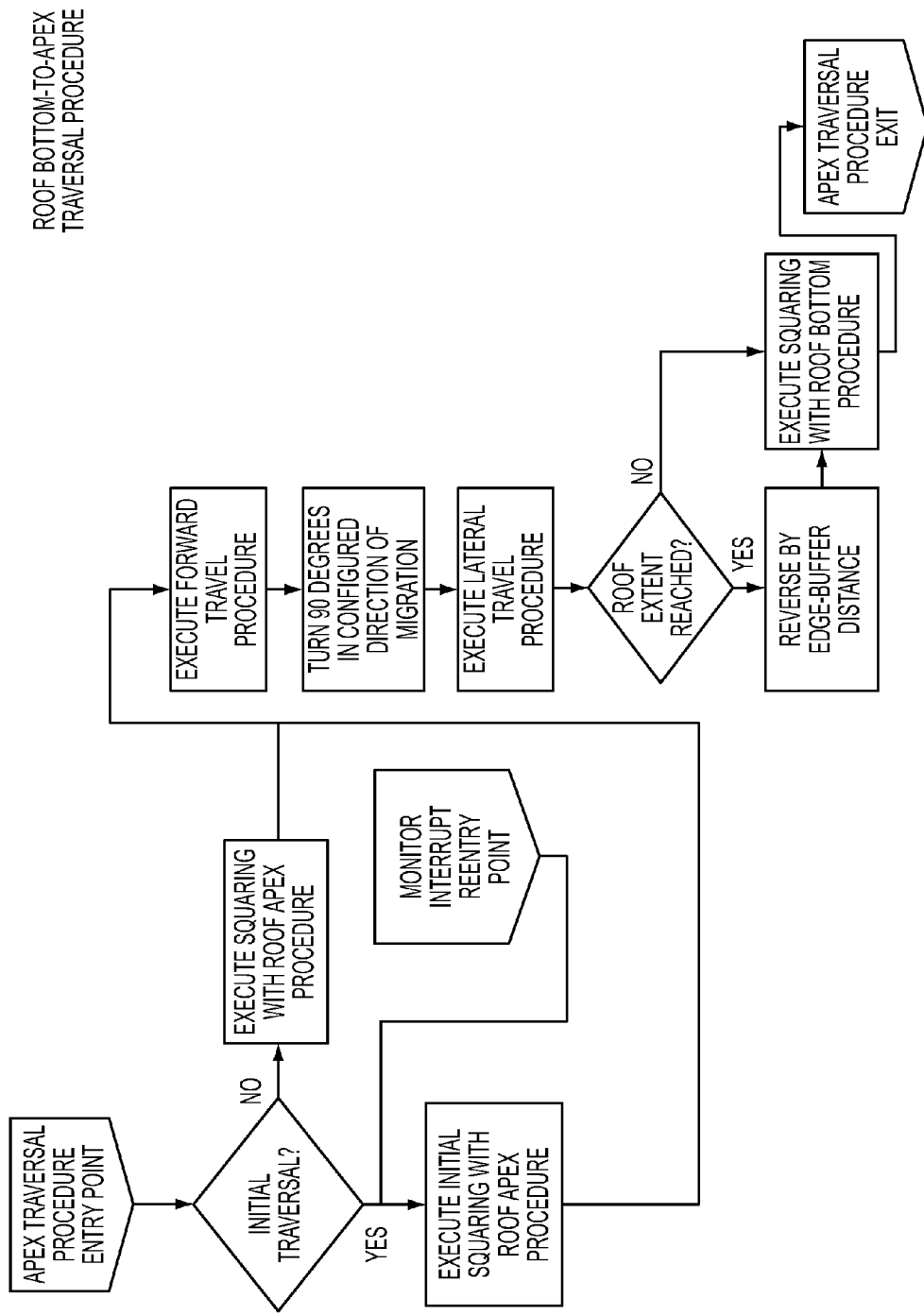

FIG. 16 is a flow chart describing a procedure called "roof bottom to apex traversal," in one embodiment.

Figure 17:
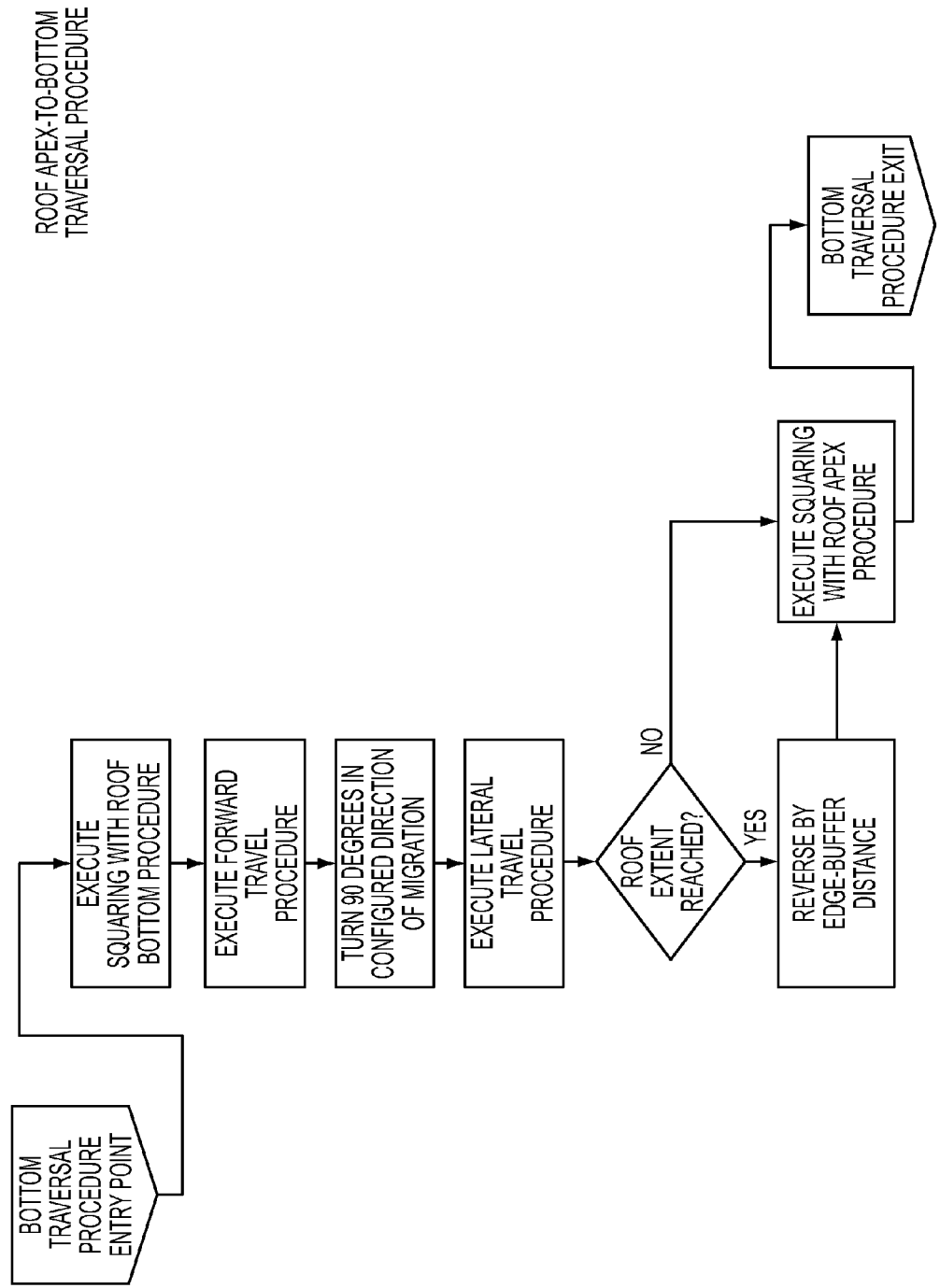

FIG. 17 is a flow chart describing a procedure called "roof apex to bottom traversal," in one embodiment.

Figure 18:
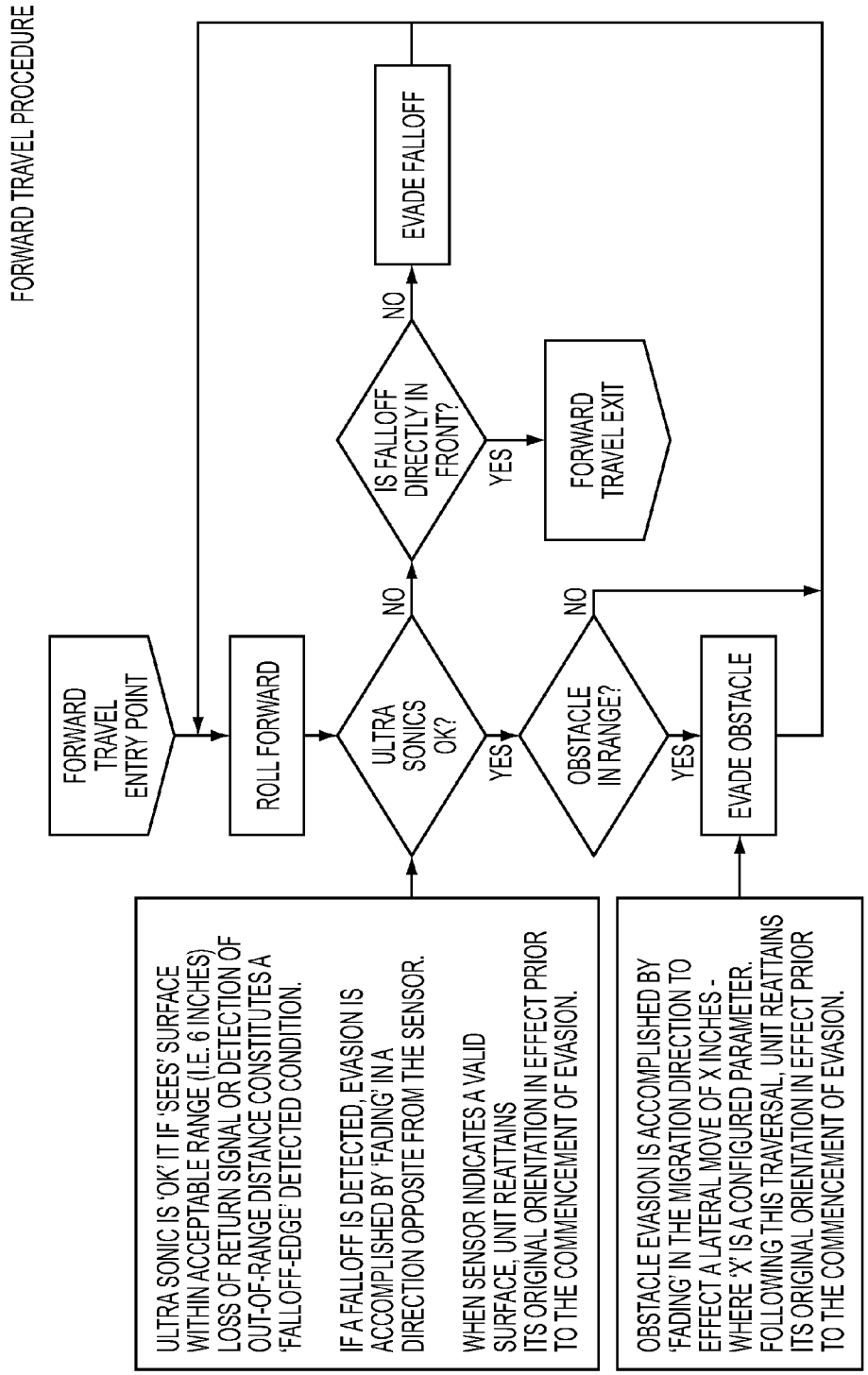

FIG. 18 is a flow chart describing a procedure called "forward travel," in one embodiment. The step labeled "ultrasonics OK?" refers to the ultrasonic range detectors. The answer to this query is yes if the range detectors sense a surface within an acceptable range (e.g., six inches). The loss of a return signal, or the detection of an "out of range" distance, indicates an imminent "falloff-edge" detected condition. If a falloff condition is imminent, the "evade falloff" step is accomplished—which includes executing an evasive maneuver by "fading" in a direction opposite from the sensor. After fading, when the sensors indicate a valid surface, the vehicle re-attains its original heading and orientation that was in effect prior to the evasive maneuver.

The step labeled "evade obstacle" is accomplished by fading in the migration direction, to accomplish a lateral move of X inches, where X is a configured parameter. Following this lateral move, the vehicle re-attains its original heading and orientation that was in effect prior to the evasive maneuver.

Figure 19:
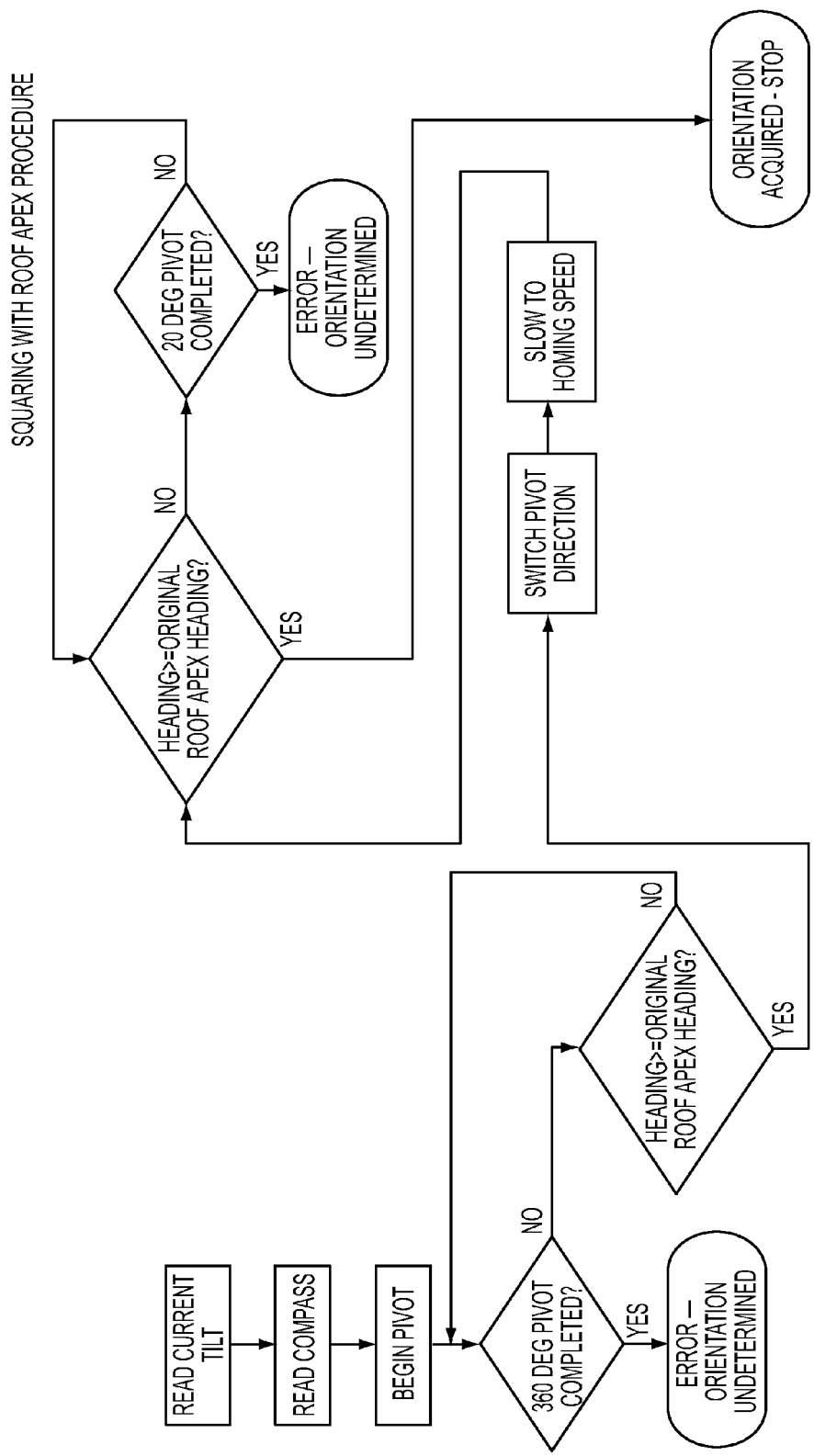

FIG. 19 is a flow chart describing a procedure called "squaring with roof apex," in one embodiment.

Figure 20:
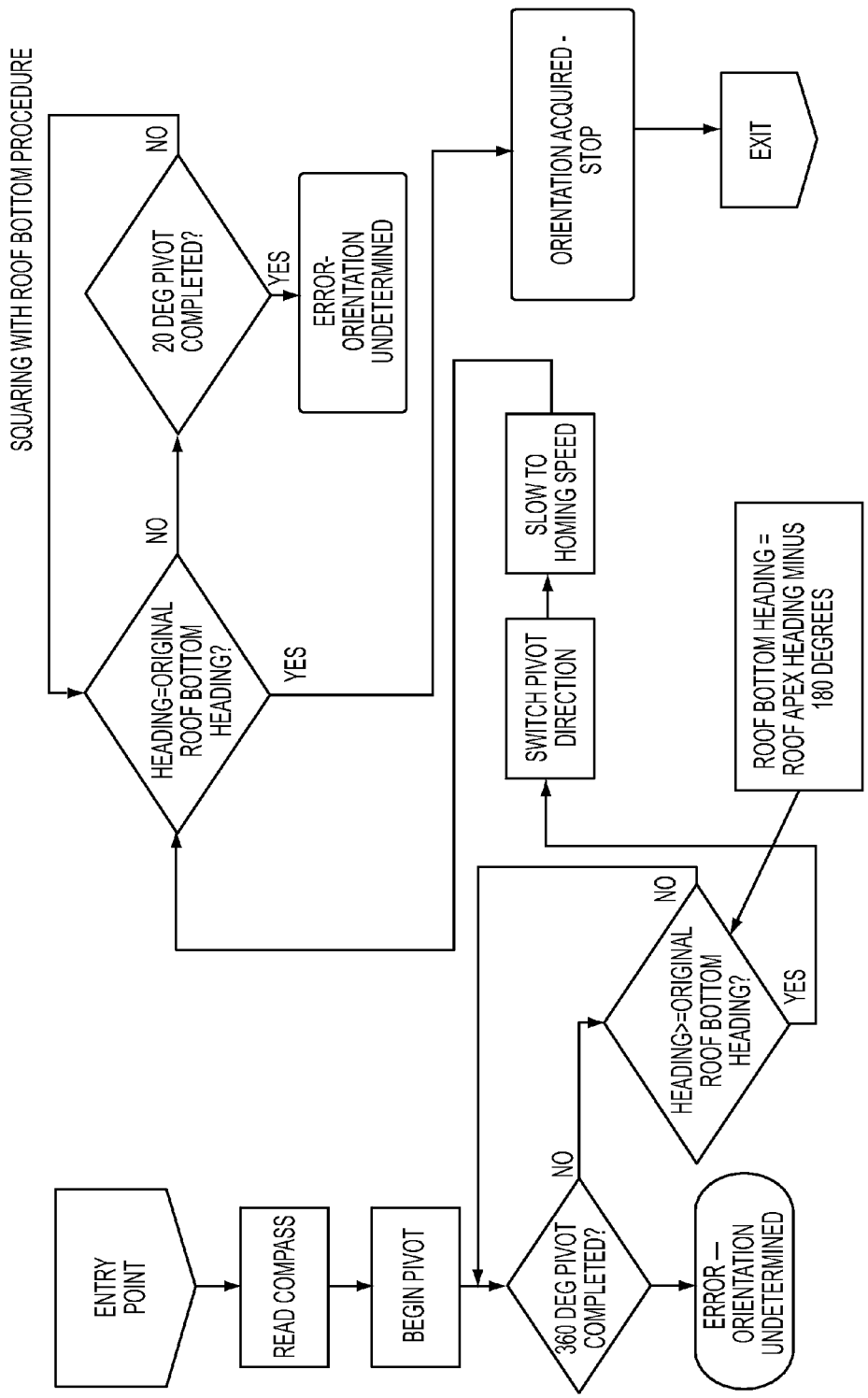

FIG. 20 is a flow chart describing a procedure called "squaring with roof bottom," in one embodiment.

Figure 21:
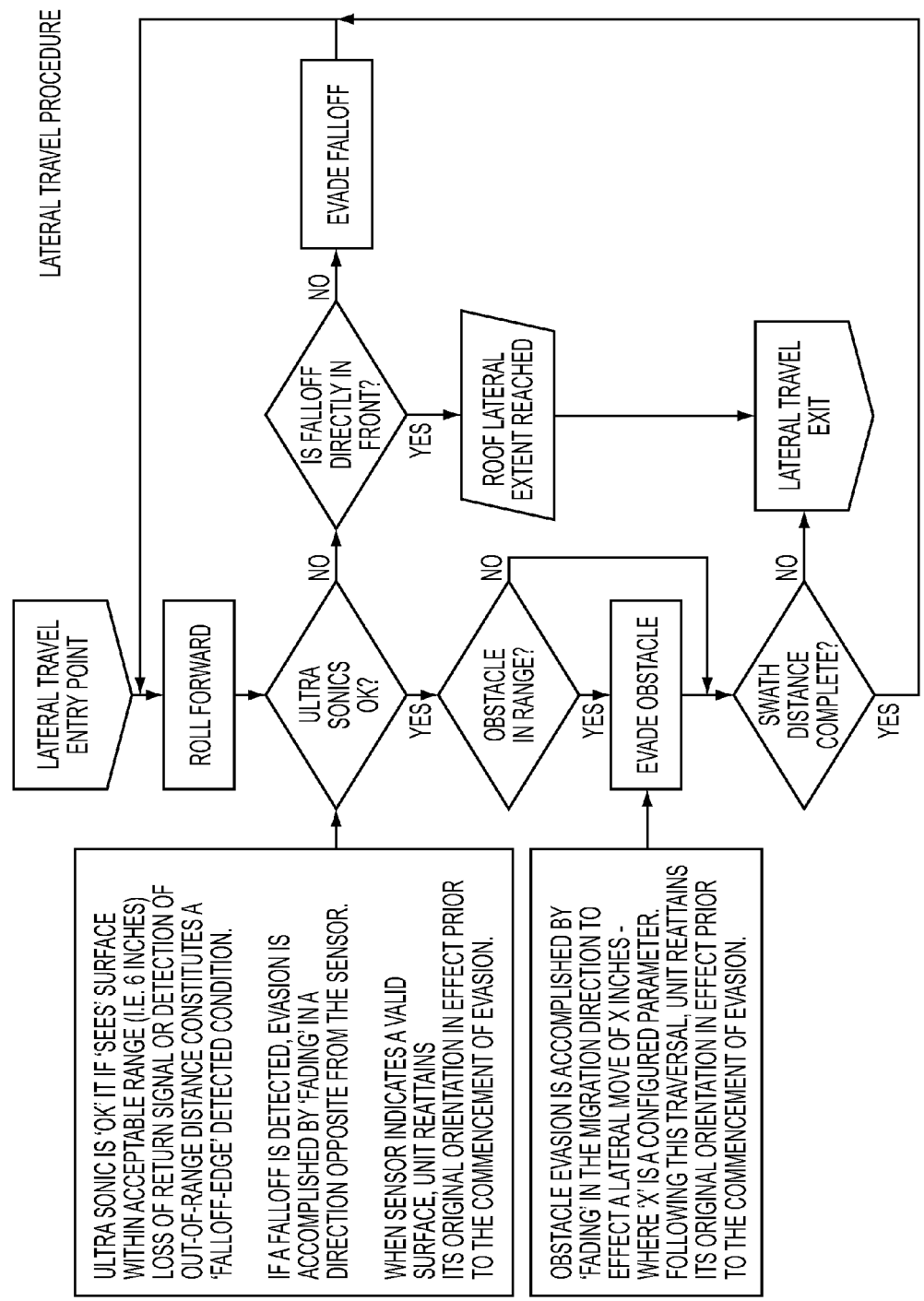

FIG. 21 is a flow chart describing a procedure called "lateral travel," in one embodiment. The steps labeled "ultrasonics OK?" and "evade falloff" and "evade obstacle" are accomplished in a similar manner as described for FIG. 18.

Figure 22:
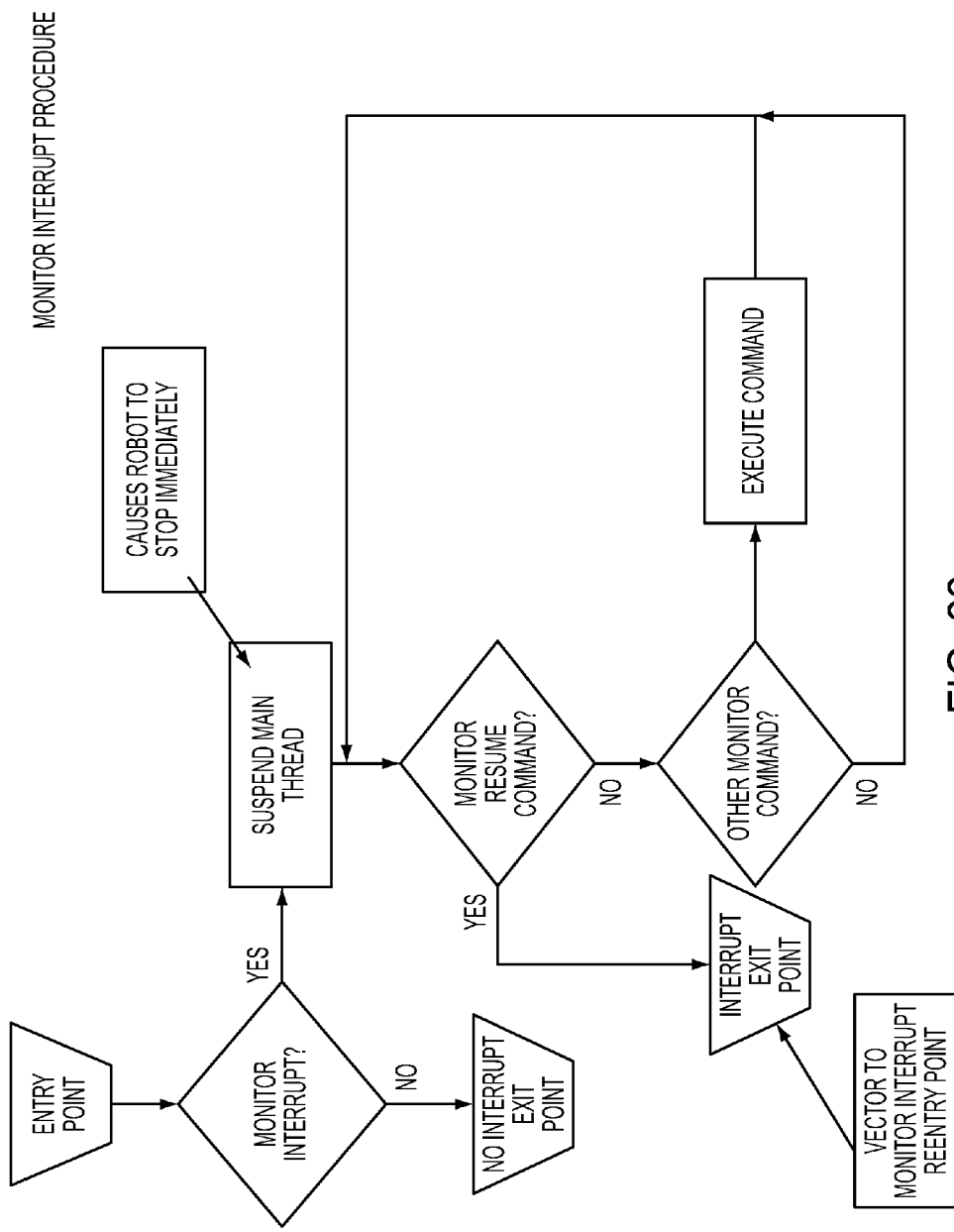

FIG. 22 is a flow chart describing a procedure called "monitor interrupt," in one embodiment. The term monitor refers to a remote computer 185 (shown in FIG. 5) which may be used to receive a streaming video feed from the vehicle. The procedure describes how the system would re-start after an interruption of the signal (the video feed, for example) to the remote computer 185.

Figure 23:
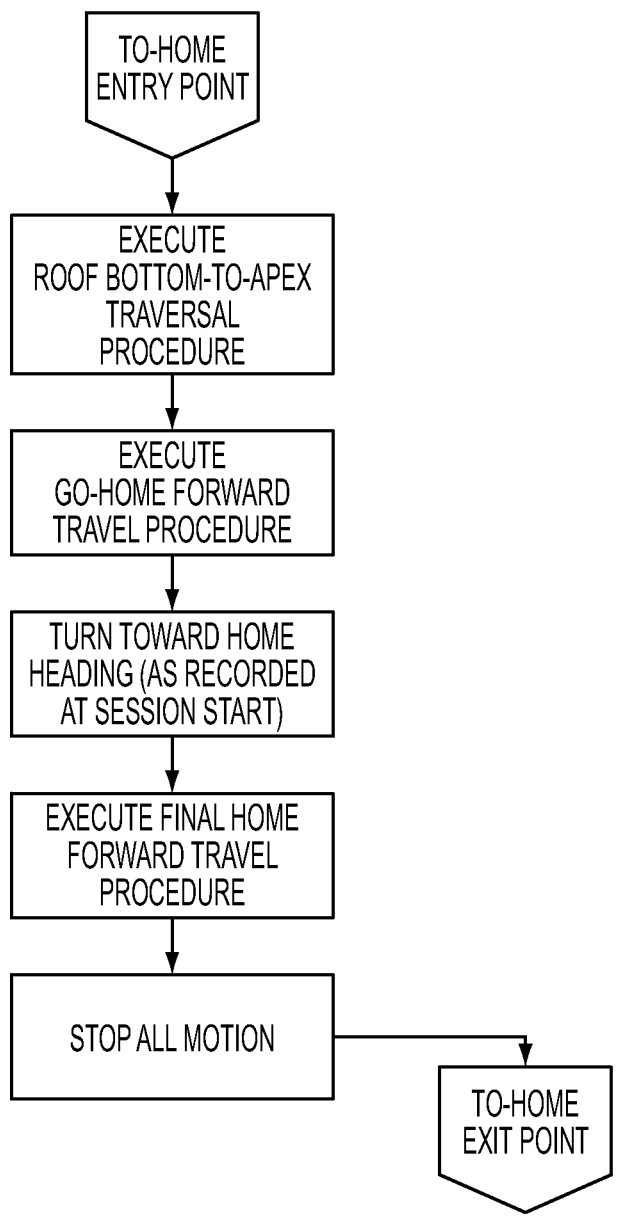

FIG. 23 is a flow chart describing a procedure called "tohome," in one embodiment. The home base may be a panel or platform 178 such as the one described and shown in FIG. 10, or it may be any other location.

Figure 24:
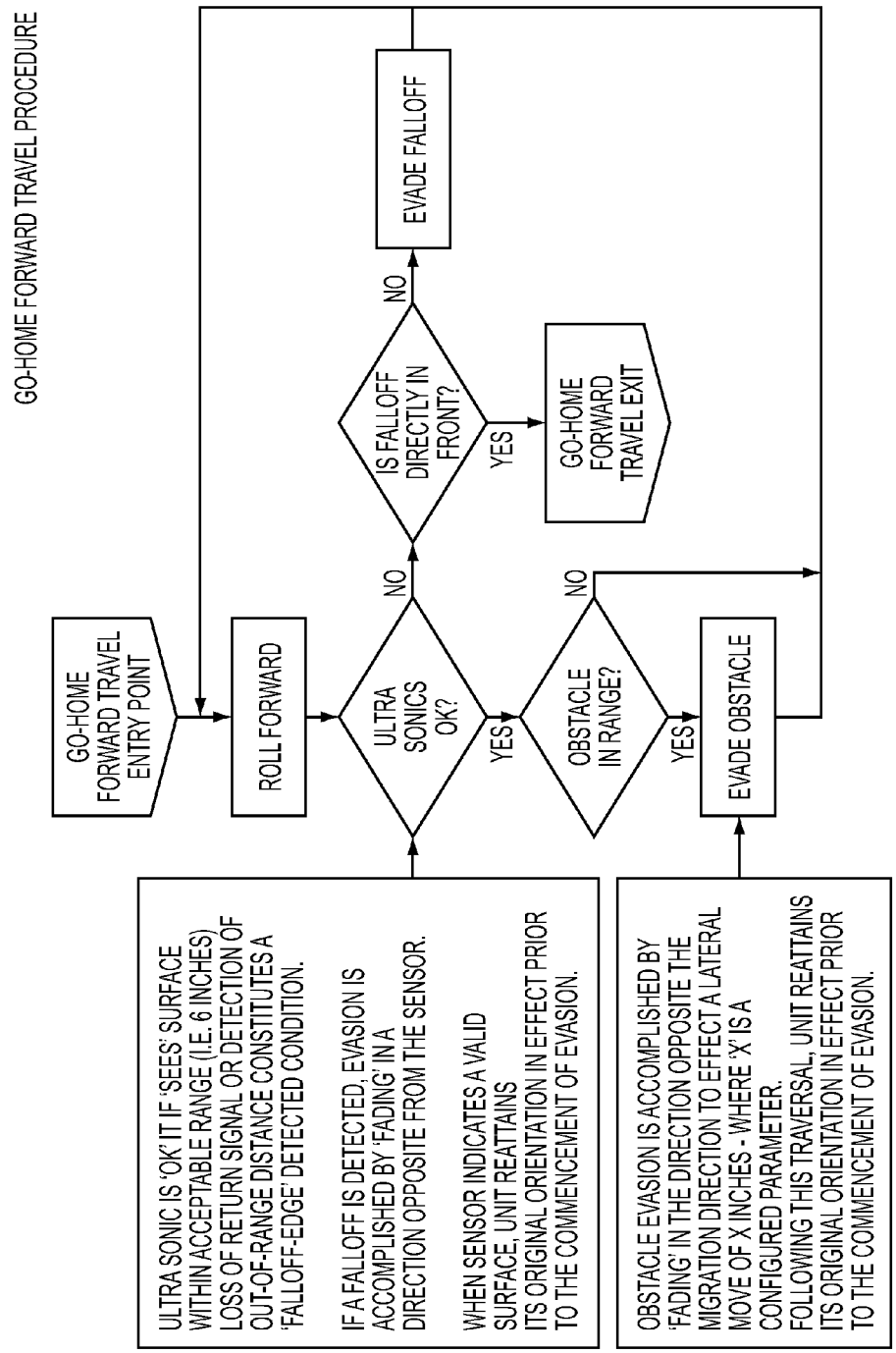

FIG. 24 is a flow chart describing a procedure called "go-home forward travel," in one embodiment. The steps labeled "ultrasonics OK?" and "evade falloff" and "evade obstacle" are accomplished in a similar manner as described for FIG. 18.

Figure 25:
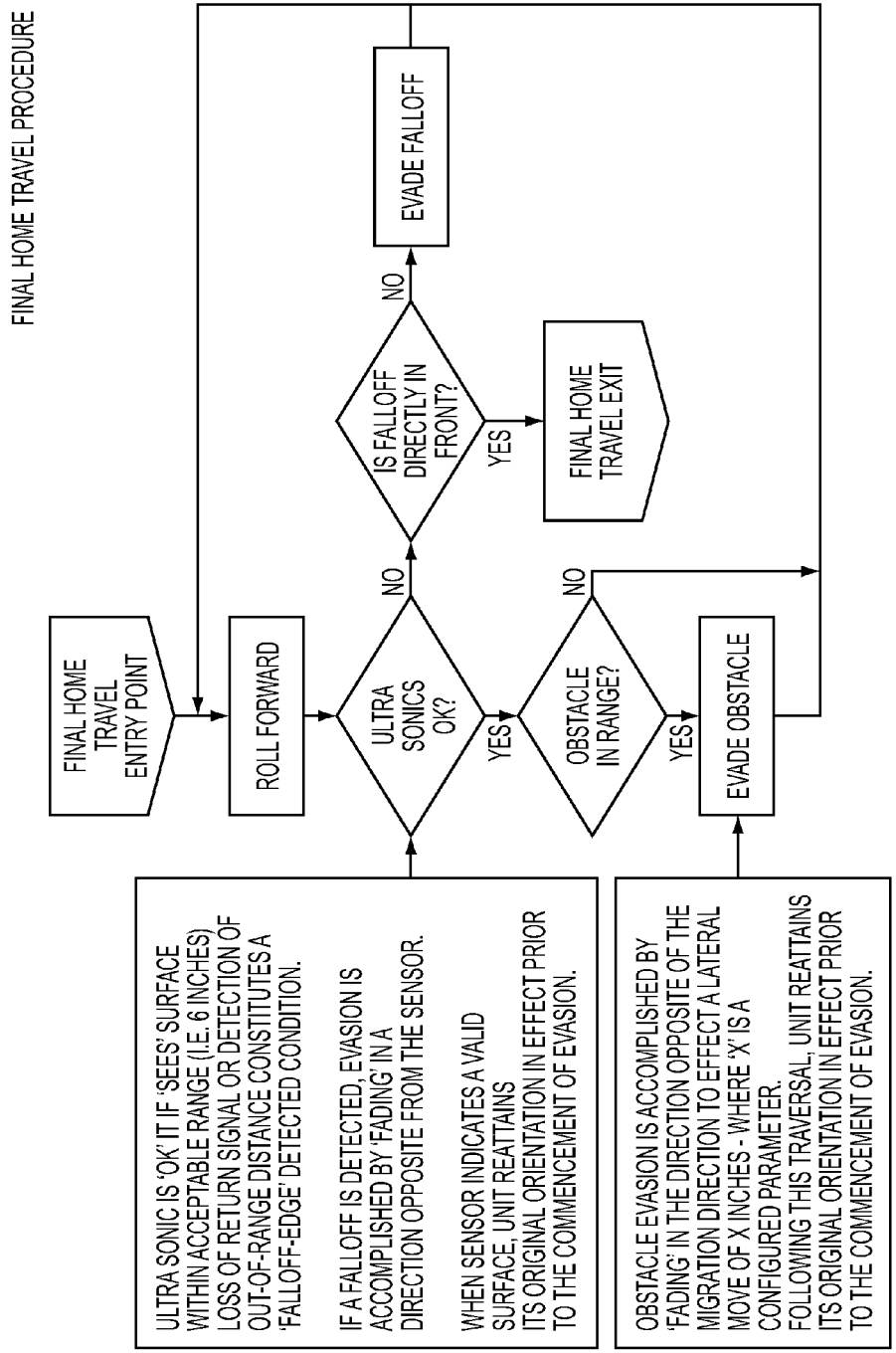

FIG. 25 is a flow chart describing a procedure called "final home travel," in one embodiment. Again, the steps labeled "ultrasonics OK?" and "evade falloff" and "evade obstacle" are accomplished in a similar manner as described for FIG. 18.

Remote Console

As illustrated in FIG. 5, the inspection system generally may include a vehicle 100, a remote console 180 and, optionally, a remote computer 185 for storing, analyzing, or otherwise processing the data collected by the vehicle. As described herein, the remote console 180 may include it own user interface controls and a wireless transceiver, which is in communication with a wireless router 152 onboard the vehicle 100.

According to particular embodiments, as illustrated in FIG. 30, the system, may include a remote console 580 having a variety of user interface controls and a wireless transceiver 590 that is in communication with, for example, the wireless router 592 onboard the vehicle 505 (FIG. 27). The wireless transceiver 590, as the name implies, includes both a transmitter and a receiver. The remote console 580, as shown, may include a portable tablet computer 585 and a controller 800 (which includes one or more joysticks) as illustrated in FIG. 30.

The computer 585 may also include a display of the current job information 701 and an interface for entering information 702, for example, about a new job, a new surface, or a new segment under inspection.

The tablet computer 585 may include a display of the images captured by the onboard imaging system, from any of the one or more cameras 551, 552, 553 which may be present and capturing images. In this aspect, the computer 585 may include a button or other selector for allowing the user to select the incoming image from one of the onboard cameras 551, 552, 553 for viewing on the display. The camera buttons 703, according to particular embodiments, may be used to display the incoming images from any one of the onboard cameras, any two cameras, or all the cameras, simultaneously.

The camera buttons 703 may be used to select the driving camera 551 and view an overall image of the terrain. The camera buttons 703, according to particular embodiments, may be configured to select the inspection camera 552 and to receive inputs from the user for adjusting inspection camera 552—for example, to pan in a certain direction, to tilt the lens, or to zoom in (or out), in order to view a desired location in greater detail.

The camera buttons 703 may be used to select the lifter camera 553 in order to see a roof shingle of interest, and to assist the user in inserting the one or more lifter blades 620L, 620R beneath the edge of a roof shingle. The lifter camera 553, of course, may also be selected so that the user can view the underside of a roof shingle, thus providing additional information about the status and overall condition of the shingle.

The imaging system, according to particular embodiments, includes a cache clearing routine for periodically clearing the imaging data from the cache. The computer 585 may include a memory for storing data and a cache for storing a subset of the imaging data so that such data is readily available for viewing on the display of the computer 585. When up to three high-resolution cameras are in use, the imaging system may collect, process, and send to the remote console 580 a large amount of imaging data. To prevent the cache from becoming nearly full and to prevent the processors from becoming otherwise overloaded with imaging data, which could slow or delay the displaying of images on the tablet computer 585, the cache clearing routine in particular embodiments may be configured to clear the imaging data from the cache. For example, the cache may be cleared of imaging data that is more than thirty seconds old, without compromising the related functions of saving the images and video captured by each of the cameras in use during an inspection.

The computer 585 may include a display of the roof pitch 704, compass heading 705, and roll 706. The computer 585 may also include a display of the current battery life 707.

The computer 585 may also include a display of the status of one or more of the range sensors 540L, 540R, 545. As illustrated in FIG. 30, across the bottom of the display, the computer 585 may include a series of symbols 711, 712, 713 which, for example may be green in color (indicating a no-fault or go condition) or red (indicating a fault or stop condition). For example, the symbol 711 may display the status of the left front sensor 540L; the symbol 712 may display the status of the rear sensor 545, and the symbol 713 may display the status of the right front sensor 540R.

In another aspect, as shown in FIG. 30, the computer 585 may include a touch screen display for detecting and processing finger contacts. One or more programs stored in memory may include instructions for selecting a command based on finger contacts, processing the command, and transmitting it to the vehicle. For example, a set of available commands may include a stop command for halting the vehicle when a finger touches a stop button 708. The camera buttons 703 may generate certain commands for directing the motion of certain components of the onboard imaging system. The display may include a video feed from the onboard imaging system. In certain embodiments, the remote console includes a wireless transmitter that is dedicated to sending the video feed from the system to a second remote display such as a television or computer monitor.

A drive control command may be used to direct the motion of the vehicle in response to finger touches in the drive control area 710 of the display. As shown, a finger touch near the center of the area 710 may direct the vehicle to maintain its position. Sliding the finger upward on the drive control area 710 directs the vehicle to move forward; sliding the finger to the right directs the vehicle to turn right, and so forth. The system may include a separate controller 800 such as a joystick for generating a signal that is responsive to mechanical motion by the user's fingers or hands, where the signal directs the motion of the vehicle. Use of a separate controller 800 may be preferred when the system is being used in harsh environments or conditions, such as extreme weather.

In another aspect, the override button 709 may permit the processing and transmission of drive control commands to move the vehicle even when one or more range sensors indicates a fault condition (from a nearby obstacle or fall risk). For example, the override button 709 may be selected when the user wishes to place the vehicle into ridge traversal mode, as described herein.

According to particular embodiments, the computer 585 may be paired with and otherwise dedicated to operation with a particular vehicle. In this aspect, the vehicle and its mated computer 585 may be provided as a set to a user. The set may be purchased, leased, or otherwise provided for gathering data about a remote location such as a roof.

In another aspect, the computer 585 may be configured to display information that is relevant to one of the uses of the vehicle. For example, when not in active use, the display may show information or advertisements about roof construction, roof repair, insurance, and the like. Information providers may pay a fee for the opportunity to display information that is specifically useful to users of the system. Also, the system may include a remote computer that is configured to receive data stored by the vehicle, analyze the data, and produce a report. The report may include a topographical map of the roof, based on positional data gathered from the positional sensors during a traversal of one or more areas of said roof. The report may also include printed information such as advertisement and coupons for services that may be useful and relevant to the users of the system.

Ridge Traversal Routine

The control system, according to particular embodiments, may include a ridge traversal routine that, in cooperation with the sensor system and motive system, directs the motion of the vehicle in a semi-autonomous mode across a ridge. Although the routine is described herein in the context of a crossing a roof peak, the technology disclosed herein is also useful and applicable in other contexts and the term ridge, of course, may be understood to include any raised area or surface that is relatively higher than surrounding areas or surfaces, whether manmade or naturally occurring. The ridge traversal routine, in general, operates to limit the velocity of the vehicle when crossing a ridge, such as the ridge line or peak of a roof. If the vehicle travels too fast over a ridge, the rotational acceleration imparted to the vehicle may cause the vehicle to flip. The routine may include a velocity limit, preventing the vehicle from exceeding the velocity limit when traversing a ridge.

The ridge traversal routine, according to particular embodiments, may includes a series of instructions directing the vehicle:

(a) to stop when the sensor system signals that one or more of the leading-end range sensors senses the presence of a ridge. The leading end of the vehicle may be the front end, the rear end, or a corner. Accordingly, the leading-end range sensor may be one of the two front range sensors 540L, 540R near the front of the vehicle 505, or the rear range sensor 500 if the rear end of the vehicle 505 approaches a ridge.

(b) to remain stopped until a user places the vehicle in ridge traversal mode. The user, for example, may select an override button or other selector on the user interface, and select the ridge traversal mode. Ridge traversal mode, according to particular embodiments, is characterized by a first velocity limit, a second velocity limit, and a resolution velocity limit.

(c) to move toward the ridge at a first velocity that is less than or equal to the first velocity limit. Through a user interface such as a joystick, for example, the user may urge the vehicle forward at full speed; however, the routine instructions prevent the vehicle from moving any faster than the first velocity limit.

(d) to stop when the sensor system signals that either (1) one or more of the trailing-end range sensors senses the absence of a surface (in other words, when the trailing end of the vehicle lifts begins to lift upward, off the surface) or (2) one or more of the leading-end range sensors senses the presence of a surface (in other words, when the leading end of the vehicle begins to settle downward, onto the surface). In this aspect, the routine instructions direct the vehicle to stop when it reaches the ridge.

(e) to move at a second velocity that is less than or equal to the second velocity limit. The second velocity represents the speed at which the vehicle moves downhill immediately after crossing a ridge.

(f) when the sensor system signals that one or more of the trailing-end range sensors senses the presence of a surface (in other words, when the trailing end of the vehicle once again senses the roof surface), to move at a resolution velocity that is less than or equal to the resolution velocity limit. The resolution velocity represents the speed at which the vehicle moves away from the ridge. The resolution velocity prevents the vehicle from accelerating too quickly down the slope.

(g) optionally, to continue moving at the resolution velocity until the vehicle stops at least once. In this aspect, a brief stop allows the vehicle control system to reset or otherwise exit the ridge traversal mode and resume normal manual driving mode.

Impression System

In one embodiment, illustrated schematically in FIG. 9, the vehicle may include an impression system 500 for obtaining an impression of a suspect area on the roof surface. For example, the imaging system may detect a depression in a roof shingle that may be a hail strike or a heat blister. A roof inspector on foot might use paper and a charcoal or crayon to make a rubbing of the depression. In this embodiment of the vehicle, the impression system 500 may include a supply of media (e.g., paper or film), a positioner to place the media on the suspect area, a crayon, stamp or inked roller to impress the media onto the suspect area, and a tray for storing the resulting impressions.

Roof and Shingle Inspection System

In another aspect, the vehicle described herein may be part of a roof inspection system. In one embodiment, the roof inspection system includes a vehicle, a lift system 170 for placing the vehicle on the roof, and a computer program for analysis of the data obtained during the inspection.

According to particular embodiments, the vehicle 505, for example, may include shingle lifter 600 that can be attached to the front end 525 of the chassis 512, as illustrated in FIG. 28 and FIG. 29 and described herein. FIG. 28 is an enlarged view of the front end of the chassis, with the left wheel (driven sprocket 514L) and left track 516L removed, for clarity. The drive shaft 513L is shown, and the right track 516R is also shown. The shingle lifter 600 may be selectively attachable; in other words, it can be attached for use when inspecting shingles or, at other times, detached. The lifter 600 therefore may include one or more fasteners for connecting the housing 610 to the front end 525 of the chassis 512. Also, the lifter camera 553 may include one or more releasable connections to the imaging system onboard the vehicle.

FIG. 29 is a perspective view of the shingle lifter 600 attached to the front end 525 of the chassis 512. The shingle lifter 600 may include one or more elongated blades 620L, 620R each comprising a main body section 622L, 620R extending lengthwise to a tapered section 624L, 624R, respectively, as shown in FIG. 29. The main body section may include a proximal portion and a distal portion, where the distal portion is bent in an upward direction, at an obtuse angle relative to the proximal portion. The tapered section may have a gradually decreasing thickness from its juncture with the main body section to the distal end of the blade, where it defines a distal edge 626L, 626R. The distal edge may be sized in thickness to facilitate insertion of the blade beneath a roof shingle.

The lifter 600 may include a motor 630 supported by the housing 610, as illustrated schematically in FIG. 28. The motor 630 may include a releasable connection to the power system onboard the vehicle. The motor 630 may be operative to rotate the blades 620L 620R between a lowermost position and an uppermost position; for example, in response to input from a user. In FIG. 28 the lowermost position is illustrated as being near or in alignment with a generally planar surface 10; however, the lowermost position may be greater than or less than the plane of such a surface 10. Similarly, the uppermost position may or may not extend beyond the generally vertical orientation shown in FIG. 28. The motor 630 may be operated to stop and maintain the blades 620L, 620R at any intermediate location.

The lifter 600 may also include a position sensor 640, which is in communication with the motor 630 and the blades 620L, 620R, and which is configured to sense the angular position of the blades 620L, 620R. The position sensor 640 in this aspect may act as a limit sensor, sending an indication to the control system when the blades are in the lowermost or uppermost position. The position sensor 640 may also be configured to report the angular position of the blades 620L, 620R to the user.

The lifter 600 may also include a force sensor 650, which is in communication with the motor 630 and the blades 620L, 620R, and which is configured to sense the force exerted against the blades 620L, 620R. The force sensor 650 may be used to measure the amount of static force (weight) and/or dynamic force that is being exerted on the blades 620L, 620R at any time. In the context of a roof shingle inspection, the force sensor 650 may be used to measure the force and estimate the flexibility of a roof shingle. The force sensor 650 may also be used to measure the amount of force required to overcome the adhesive forces and initially lift the roof shingle away from the roof surface. In this aspect, the force sensor 650 may be used to estimate the durability, status, or overall health of a roof shingle.

The imaging system 550, in this embodiment, may include a lifter camera 553 that is supported by the housing 610. In this aspect, the imaging system 550 for a vehicle may include three cameras: a driving camera 551, an inspection camera 552, and a lifter camera 553.

The field of view of the lifter camera 553 may be illuminated, in particular embodiments, by one or more lifter lamps 660. As shown in FIG. 29, one or more lifter lamps 660 may be positioned on the front face of the housing 610, near the lifter camera 553.

In another aspect, the housing 610 may be sized and shaped to facilitate the traversal of a vehicle across a valley 30, as shown graphically in FIG. 28. On many roof structures, for example, various surfaces may intersect to form a valley 30. The sloped roof surface 40 shown in FIG. 28, for example, intersects with a flat surface 10 to form a valley 30. The geometry of various intersecting roof surfaces, of course, may create a variety of angular relationships. Although the housing 610 is described herein in the context of a crossing a roof valley, the technology disclosed herein is also useful and applicable in other contexts and the term valley, of course, may be understood to include any depressed area or surface that is relatively lower than surrounding areas or surfaces, whether manmade or naturally occurring. The housing 610, according to particular embodiments, may have a front surface that extends upwardly at an acute angle relative to a flat surface 10, as illustrated in FIG. 28. In this aspect, the housing 610 is shaped to minimize unintended interference with a sloped roof surface 40 when crossing a valley 30. For example, with the blades 620L, 620R at least partially raised, the vehicle shown in FIG. 28 may be better suited to cross the valley 30 without striking the sloped surface 40 because of the size and shape of the housing 610.

In a related aspect, the lifter camera 553 may provide a view of the nearby surfaces to the user, who may elect to re-orient the vehicle before traversing a valley (if, for example, the lifter camera 553 shows that traversing a valley at a particular attitude would result in a collision or unwanted contact with the roof surface). The lifter camera 553, therefore, cooperates with the shape of the housing 610 to assist the user in avoiding collisions with a roof surface.

Lift System

In one embodiment of the lift system 170, the vehicle may be placed on the roof manually by carrying it up a ladder and placing it on the roof.

In another embodiment, not illustrated, a pole with a hook or other releasable fastener at the end, for engagement with a mating element on the vehicle, may be used to lift the vehicle up and onto the roof. The pole may be fixed in length or adjustable.

In another embodiment, illustrated in FIG. 10, the lift system 170 may include a ladder or ramp 172 having a high-traction surface 174 and/or a series of panels 176 to allow the vehicle to drive up the ramp and onto the roof. As shown, the ladder or ramp 172 may include telescoping segments so that it is expandable and collapsible for easy transport and setup. The ramp 172 may also be equipped with an angular indicator or level 177 so the operator can arrange the ramp 172 at or near the suggested angle for use. The high-traction surface or "mat" 174 may be stowed temporarily on a roller, as shown.

If rungs are present on the ladder or ramp 172, then the mat 174 may be extended atop the rungs and the vehicle may have sufficient traction to travel up the mat 174 and onto the roof. In an alternative arrangement, a series of panels 176 may be sized and shaped to fit the sections of the ramp 172. The panels 176 may be releasable attached to the ramp 172. As shown, the lift system 170 may also include a flexible platform 178 that, when in place, extends from the top of the ladder or ramp 172 onto the roof surface. In this aspect, the platform 178 may operate as a base or home location for the vehicle.

In another embodiment, illustrated in FIG. 11, the lift system 170 may include a ladder or ramp 172 and a hoist assembly. The hoist assembly, as shown, may include a platform 178 for holding the vehicle on a wheeled carriage 175, which is attached to a cable and pulley system for lifting the carriage 175, either manually or with a motor, up the ramp 172 and onto the roof. As shown, the ladder or ramp 172 may include hinged segments so that it can be folded for easy transport and setup. The ramp 172 may also be equipped with an angular indicator or level (not shown) so the operator can arrange the ramp 172 at or near the suggested angle for safe and proper use. The lift system 170 may also include a flexible platform at the top of the ramp 172 (not shown) which, when in place, extends from the top of the ramp 172 onto the roof surface of the roof and operates as a base or home location for the vehicle.

Remote Analysis

In one embodiment, the system may include a computer program for analyzing the images obtained using, for example, digital image analysis software or other three-dimensional imaging techniques. In one embodiment, digital image analysis software may be used to discern the existence, nature, density and severity of roof damage in particular areas of interest in the digital image record gathered by the vehicle.

As described briefly above in the discussion of the onboard control system, all the data from each and every segment of the roof traversed by the vehicle may be stored and downloaded for later analysis. For example, data such as the compass heading, pitch, roll, time, date, and distance traveled may be used to make a virtual model of the roof. From such a virtual model, information such as total area, roof pitch at specific locations, and the location of particular topographic characteristics or flaws (damage) may be quantified.

The computer program, in one embodiment, may include algorithms particularly designed to analyze a specific area in order to determine whether a particular feature or flaw represents damage (from hail, for example) or instead represents normal wear. In this aspect, the vehicle and its systems may be used to both provide an objective record of the roof condition and an objective analysis of the features observed.

Business Model

In another aspect, the vehicle and related systems described herein may be used to inspect a roof and provide reports and recommendations that are based on the objective evidence obtained by the vehicle, instead of the subjective opinion of a particular roof inspector.

The vehicle and its related systems make a persistent visual record of the subject roof, thereby allowing people and companies with potentially competing interests the opportunity to review an objective record of the roof condition.

In one embodiment, the method may include the steps of positioning an inspection vehicle onto a roof, navigating and inspecting a select portion of the roof, obtaining images of the roof. The method may include the further steps of analyzing the images, analyzing the physical data obtained, producing a report, making recommendations, and in certain embodiments making an insurance claim evaluation and decision based on policy criteria and limitations. The method may also include collecting revenue in exchange for the images, the data, the report, or any other information gathered during the inspection process.

In another embodiment, the method may also include the step of leasing the inspection vehicle to a person or enterprise engaged in roof inspections.

CONCLUSION

Although the vehicles, systems, and methods are described herein in the context of inspecting a roof, the technology disclosed herein is also useful and applicable in other contexts. Moreover, although several embodiments have been described herein, those of ordinary skill in art, with the benefit of the teachings of this disclosure, will understand and comprehend many other embodiments and modifications for this technology. The invention therefore is not limited to the specific embodiments disclosed or discussed herein, and that may other embodiments and modifications are intended to be included within the scope of the appended claims. Moreover, although specific terms are occasionally used herein, as well as in the claims or concepts that follow, such terms are used in a generic and descriptive sense only, and should not be construed as limiting the described invention or the claims that follow.

The invention claimed is:

1. A vehicle comprising:
a chassis supported above a terrain and having an upper deck and a generally opposing bottom surface;
a motive system supported by said chassis and comprising at least one motor operative to propel said vehicle and one or more partially collapsible treads for frictionally engaging said terrain;
a power system supported by said chassis and providing energy to power said vehicle;
an imaging system supported by said chassis and comprising a driving camera having a lens assembly spaced apart from and above said chassis, an inspection camera mounted near a front end of said chassis;
a sensor system supported by said chassis and comprising one or more positional sensors and a plurality of range sensors;
a shingle lifter that is selectively attachable to said chassis, selectively connectable to said power system, and selectively in communication with said control system, said shingle lifter comprising (a) one or more elongated blades, each comprising a main body section having a first thickness and extending lengthwise to a tapered section, said tapered section having a gradually decreasing thickness from its juncture with said main body section to define a distal edge, and (b) a motor supported by a housing and operative to selectively rotate said one or more elongated blades between a lowermost position and an uppermost position; and
a control system supported by said chassis and electrically connected to said motive system, said power system, said imaging system, said sensor system, and said shingle lifter system,
wherein said control system comprises a wireless router and one or more microcontrollers dedicated to monitoring said sensor system, processing said camera images, activating said motive system, operating said shingle lifter system, and receiving signals from said remote console, wherein said remote console comprises a tablet computer having user interface controls, a memory, and a wireless transceiver.

2. The vehicle of claim 1, wherein said motive system comprises one or more wheels for supporting said one or more partially collapsible treads.

3. The vehicle of claim 1, wherein said motive system comprises a pair of substantially continuous tracks engaged with at least one driven sprocket engaged with said motor, and supported by at least one free sprocket, wherein each of said pair of tracks supports said one or more partially collapsible treads.

4. The vehicle of claim 1, wherein said chassis has a front end and a rear end with a longitudinal axis extending therebetween, and wherein said bottom surface defines a first clearance near said ends and a second clearance along a substantially transverse axis extending between said sides and located intermediate said ends.

5. The vehicle of claim 4, wherein said second clearance is substantially greater than said first clearance when said chassis is positioned on a substantially planar surface, and wherein said one or more partially collapsible treads and said second clearance cooperate to substantially prevent overturning of said vehicle.

6. The vehicle of claim 1, wherein said tablet computer further comprises a display and a cache of imaging data, said cache configured to store a subset of imaging data received via said wireless transceiver, and wherein said imaging system comprises a cache clearing routine for periodically clearing the imaging data from the cache.

7. The vehicle of claim 1, wherein said remote console further comprises a joystick configured to generate a signal responsive to one or more mechanical adjustments, wherein said signal directs the motion of said vehicle.

8. The vehicle of claim 1, wherein said user interface controls comprise a camera selector for displaying one or more images from said driving camera or said inspection camera, or both simultaneously.

9. The vehicle of claim 1, wherein said plurality of range sensors comprises a front left range sensor, a front right range sensor, and a rear range sensor.

10. The vehicle of claim 9, wherein said sensor system further comprises:
a selectively rotatable left boom assembly mounted to said chassis and supporting said front left range sensor above and beyond a left side of said chassis, and
a selectively rotatable right boom assembly mounted to said chassis and supporting said front right range sensor above and beyond a right side of said chassis.

11. The vehicle of claim 1, wherein said shingle lifter further comprises:
a position sensor in communication with said motor and with said blades, and configured to sense a position of said one or more elongated blades; and
a force sensor in communication with said motor and with said blades, configured to measure a force exerted against said one or more elongated blades.

12. The vehicle of claim 11, wherein said shingle lifter further comprises:
a lifter camera supported by said housing and electrically connected to said imaging system; and
one or more lifter lamps supported by said housing, electrically connected to said control system, and positioned to illuminate at least a portion of said lifter camera's field of view.

13. The vehicle of claim 11, wherein said user interface controls comprise a camera selector for displaying one or more images from said driving camera, said inspection camera, or said lifter camera.

14. The vehicle of claim 1, wherein said main body section comprises a proximal portion near said motor and a distal portion bent upwardly and at an obtuse angle relative to said proximal portion.

15. A vehicle comprising:
- a chassis supported above a terrain and having an upper deck and a generally opposing bottom surface;
- a motive system supported by said chassis and comprising at least one motor operative to propel said vehicle and one or more partially collapsible treads for frictionally engaging said terrain;
- a power system supported by said chassis and providing energy to power said vehicle;
- an imaging system supported by said chassis and comprising a driving camera having a lens assembly spaced apart from and above said chassis, an inspection camera mounted near a front end of said chassis, and a wireless router for transmitting camera images to a remote console;
- a sensor system supported by said chassis and comprising one or more positional sensors and a plurality of range sensors, said range sensors comprising one or more leading-end range sensors and one or more trailing-end range sensors; and
- a control system supported by said chassis and electrically connected to said motive system, said power system, said imaging system, and said sensor system,
- wherein said control system comprises a wireless router and one or more microcontrollers dedicated to monitoring said sensor system, processing said camera images, activating said motive system, and receiving signals from said remote console, wherein said remote console comprises user interface controls and a wireless transmitter, and
- wherein said control system comprises a ridge traversal routine that, in cooperation with said sensor system and said motive system, directs the motion of said vehicle in a semi-autonomous mode across a ridge at a velocity that is less than or equal to a velocity limit.

16. The vehicle of claim 15, wherein said ridge traversal routine comprises instructions directing said vehicle:
- (a) to stop when said sensor system signals that one or more of said leading-end range sensors senses the presence of a ridge;
- (b) to remain stopped until a user places said vehicle in a ridge traversal mode, said mode characterized by a first velocity limit, a second velocity limit, and a resolution velocity limit;
- (c) to move toward said ridge at a first velocity that is less than or equal to said first velocity limit;
- (d) to stop when said sensor system signals that either one or more of said trailing-end range sensors senses the absence of a surface or one or more of said leading-end range sensors senses the presence of a surface;
- (e) to move at a second velocity that is less than or equal to said second velocity limit;
- (f) when said sensor system signals that one or more of said trailing-end range sensors senses the presence of a surface, to move at a resolution velocity that is less than or equal to said resolution velocity limit; and
- (g) to move at said resolution velocity until said vehicle stops at least once.

17. The vehicle of claim 15, wherein said motive system comprises one or more wheels for supporting said one or more partially collapsible treads.

18. The vehicle of claim 15, wherein said motive system comprises a pair of substantially continuous tracks engaged with at least one driven sprocket engaged with said motor, and supported by at least one free sprocket, wherein each of said pair of tracks supports said one or more partially collapsible treads.

19. The vehicle of claim 15, wherein said chassis has a front end and a rear end with a longitudinal axis extending therebetween, and wherein said bottom surface defines a first clearance near said ends and a second clearance along a substantially transverse axis extending between said sides and located intermediate said ends.

20. The vehicle of claim 19, wherein said second clearance is substantially greater than said first clearance when said chassis is positioned on a substantially planar surface, and wherein said one or more partially collapsible treads and said second clearance cooperate to substantially prevent overturning of said vehicle.

21. The vehicle of claim 15, wherein said user interface controls comprise a camera selector for displaying one or more images from said driving camera or said inspection camera, or both simultaneously.

22. The vehicle of claim 15, wherein said plurality of range sensors comprises a front left range sensor, a front right range sensor, and a rear range sensor, and wherein said sensor system further comprises:
- a selectively rotatable left boom assembly mounted to said chassis and supporting said front left range sensor above and beyond a left side of said chassis, and
- a selectively rotatable right boom assembly mounted to said chassis and supporting said front right range sensor above and beyond a right side of said chassis.

* * * * *